(12) United States Patent
Judge

(10) Patent No.: US 8,069,481 B2
(45) Date of Patent: Nov. 29, 2011

(54) SYSTEMS AND METHODS FOR MESSAGE THREAT MANAGEMENT

(75) Inventor: Paul Judge, Alpharetta, GA (US)

(73) Assignee: McAfee, Inc., Santa Clara, CA (US)

( * ) Notice: Subject to any disclaimer, the term of this patent is extended or adjusted under 35 U.S.C. 154(b) by 948 days.

(21) Appl. No.: 11/456,960

(22) Filed: Jul. 12, 2006

(65) Prior Publication Data

US 2006/0265747 A1 Nov. 23, 2006

Related U.S. Application Data

(63) Continuation of application No. 10/361,091, filed on Feb. 7, 2003, now Pat. No. 7,096,498, which is a continuation-in-part of application No. 10/094,266, filed on Mar. 8, 2002, now Pat. No. 7,124,438, and a continuation-in-part of application No. 10/093,553, filed on Mar. 8, 2002, now Pat. No. 6,941,467, and a continuation-in-part of application No. 10/094,211, filed on Mar. 8, 2002, now Pat. No. 7,458,098.

(51) Int. Cl.
*G06F 11/00* (2006.01)

(52) U.S. Cl. ............. 726/22; 726/13; 713/188; 709/224

(58) Field of Classification Search .................... 726/13, 726/22–25; 709/206–207, 224, 229; 713/188
See application file for complete search history.

(56) References Cited

U.S. PATENT DOCUMENTS

| | | |
|---|---|---|
| 4,289,930 A | 9/1981 | Connolly et al. |
| 4,384,325 A | 5/1983 | Slechta et al. |
| 4,386,416 A | 5/1983 | Giltner et al. |
| 4,532,588 A | 7/1985 | Foster |
| 4,713,780 A | 12/1987 | Schultz et al. |
| 4,754,428 A | 6/1988 | Schultz et al. |

(Continued)

FOREIGN PATENT DOCUMENTS

CA 2564533 12/2005

(Continued)

OTHER PUBLICATIONS

Article entitled "An Example-Based Mapping Method for Text Categorization and Retrieval" by Yang et. al., in *ACM Transactions on Information Systems*, Jul. 1994, vol. 12, No. 3, pp. 252-277.

(Continued)

*Primary Examiner* — Kim Vu
*Assistant Examiner* — Baotran N To
(74) *Attorney, Agent, or Firm* — Fish & Richardson P.C.

(57) ABSTRACT

The present invention is directed to systems and methods for detecting unsolicited and threatening communications and communicating threat information related thereto. Threat information is received from one or more sources; such sources can include external security databases and threat information data from one or more application and/or network layer security systems. The received threat information is reduced into a canonical form. Features are extracted from the reduced threat information; these features in conjuntion with configuration data such as goals are used to produce rules. In some embodiments, these rules are tested against one or more sets of test data and compared against the same or different goals; if one or more tests fail, the rules are refined until the tests succeed within an acceptable margin of error. The rules are then propagated to one or more application layer security systems.

17 Claims, 16 Drawing Sheets

U.S. PATENT DOCUMENTS

| | | |
|---|---|---|
| 4,837,798 A | 6/1989 | Cohen et al. |
| 4,853,961 A | 8/1989 | Pastor |
| 4,864,573 A | 9/1989 | Horsten |
| 4,951,196 A | 8/1990 | Jackson |
| 4,975,950 A | 12/1990 | Lentz |
| 4,979,210 A | 12/1990 | Nagata et al. |
| 5,008,814 A | 4/1991 | Mathur |
| 5,020,059 A | 5/1991 | Gorin et al. |
| 5,051,886 A | 9/1991 | Kawaguchi et al. |
| 5,054,096 A | 10/1991 | Beizer |
| 5,105,184 A | 4/1992 | Pirani et al. |
| 5,119,465 A | 6/1992 | Jack et al. |
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske, Jr. et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,621,889 A | 4/1997 | Lermuzeaux et al. |
| 5,632,011 A | 5/1997 | Landfield et al. |
| 5,638,487 A | 6/1997 | Chigier |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo, II |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr-Hoyman et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare, Jr. et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore, Jr. et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,836 A | 4/1999 | Freivald et al. |
| 5,903,723 A | 5/1999 | Becker et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |
| 6,035,423 A | 3/2000 | Hodges et al. |
| 6,052,709 A | 4/2000 | Paul |
| 6,058,381 A | 5/2000 | Nelson |
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,088,804 A | 7/2000 | Hill et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |
| 6,108,691 A | 8/2000 | Lee et al. |
| 6,108,786 A | 8/2000 | Knowlson |
| 6,118,856 A | 9/2000 | Paarsmarkt et al. |

| | | | | | | |
|---|---|---|---|---|---|---|
| 6,119,137 | A | 9/2000 | Smith et al. | 6,735,703 B1 | 5/2004 | Kilpatrick et al. |
| 6,119,142 | A | 9/2000 | Kosaka | 6,738,462 B1 | 5/2004 | Brunson |
| 6,119,230 | A | 9/2000 | Carter | 6,742,124 B1 | 5/2004 | Kilpatrick et al. |
| 6,119,236 | A | 9/2000 | Shipley | 6,742,128 B1 | 5/2004 | Joiner |
| 6,122,661 | A | 9/2000 | Stedman et al. | 6,754,705 B2 | 6/2004 | Joiner et al. |
| 6,141,695 | A | 10/2000 | Sekiguchi et al. | 6,757,830 B1 | 6/2004 | Tarbotton et al. |
| 6,141,778 | A | 10/2000 | Kane et al. | 6,768,991 B2 | 7/2004 | Hearnden |
| 6,145,083 | A | 11/2000 | Shaffer et al. | 6,769,016 B2 | 7/2004 | Rothwell et al. |
| 6,151,675 | A | 11/2000 | Smith | 6,772,196 B1 * | 8/2004 | Kirsch et al. ............ 709/206 |
| 6,161,130 | A * | 12/2000 | Horvitz et al. ............ 709/206 | 6,775,657 B1 | 8/2004 | Baker |
| 6,185,689 | B1 | 2/2001 | Todd, Sr. et al. | 6,792,546 B1 | 9/2004 | Shanklin et al. |
| 6,192,407 | B1 | 2/2001 | Smith et al. | 6,880,156 B1 | 4/2005 | Landherr et al. |
| 6,199,102 | B1 | 3/2001 | Cobb | 6,892,178 B1 | 5/2005 | Zacharia |
| 6,202,157 | B1 | 3/2001 | Brownlie et al. | 6,892,179 B1 | 5/2005 | Zacharia |
| 6,219,714 | B1 | 4/2001 | Inhwan et al. | 6,892,237 B1 | 5/2005 | Gai et al. |
| 6,223,213 | B1 | 4/2001 | Cleron et al. | 6,895,385 B1 | 5/2005 | Zacharia et al. |
| 6,249,575 | B1 | 6/2001 | Heilmann et al. | 6,907,430 B2 | 6/2005 | Chong et al. |
| 6,249,807 | B1 | 6/2001 | Shaw et al. | 6,910,135 B1 | 6/2005 | Grainger |
| 6,260,043 | B1 | 7/2001 | Puri et al. | 6,928,556 B2 * | 8/2005 | Black et al. ............ 726/6 |
| 6,269,447 | B1 | 7/2001 | Maloney et al. | 6,941,348 B2 | 9/2005 | Petry et al. |
| 6,269,456 | B1 | 7/2001 | Hodges et al. | 6,941,467 B2 | 9/2005 | Judge et al. |
| 6,272,532 | B1 | 8/2001 | Feinleib | 6,968,461 B1 | 11/2005 | Lucas et al. |
| 6,275,942 | B1 | 8/2001 | Bernhard et al. | 7,089,428 B2 | 8/2006 | Farley et al. |
| 6,279,113 | B1 | 8/2001 | Vaidya | 7,092,992 B1 * | 8/2006 | Yu ............ 709/206 |
| 6,279,133 | B1 | 8/2001 | Vafai et al. | 7,254,712 B2 | 8/2007 | Godfrey et al. |
| 6,282,565 | B1 | 8/2001 | Shaw et al. | 2001/0049793 A1 | 12/2001 | Sugimoto |
| 6,285,991 | B1 | 9/2001 | Powar | 2002/0004902 A1 | 1/2002 | Toh et al. |
| 6,289,214 | B1 | 9/2001 | Backstrom | 2002/0016910 A1 | 2/2002 | Wright et al. |
| 6,298,445 | B1 | 10/2001 | Shostack et al. | 2002/0023140 A1 | 2/2002 | Hile et al. |
| 6,301,668 | B1 | 10/2001 | Gleichauf et al. | 2002/0026591 A1 | 2/2002 | Hartley et al. |
| 6,304,898 | B1 | 10/2001 | Shiigi | 2002/0032871 A1 | 3/2002 | Malan et al. |
| 6,304,973 | B1 | 10/2001 | Williams | 2002/0035683 A1 | 3/2002 | Kaashoek et al. |
| 6,311,207 | B1 | 10/2001 | Mighdoll et al. | 2002/0042876 A1 | 4/2002 | Smith |
| 6,317,829 | B1 | 11/2001 | Van Oorschot | 2002/0046041 A1 | 4/2002 | Lang |
| 6,320,948 | B1 | 11/2001 | Heilmann et al. | 2002/0049853 A1 | 4/2002 | Chu et al. |
| 6,321,267 | B1 | 11/2001 | Donaldson | 2002/0059454 A1 | 5/2002 | Barrett et al. |
| 6,324,569 | B1 | 11/2001 | Ogilvie et al. | 2002/0078382 A1 | 6/2002 | Sheikh et al. |
| 6,324,647 | B1 | 11/2001 | Bowman-Amuah | 2002/0087882 A1 | 7/2002 | Schneier et al. |
| 6,324,656 | B1 | 11/2001 | Gleichauf et al. | 2002/0095492 A1 | 7/2002 | Kaashoek et al. |
| 6,330,589 | B1 | 12/2001 | Kennedy | 2002/0112185 A1 | 8/2002 | Hodges |
| 6,347,374 | B1 | 2/2002 | Drake et al. | 2002/0116627 A1 | 8/2002 | Tarbotton et al. |
| 6,353,886 | B1 | 3/2002 | Howard et al. | 2002/0120853 A1 | 8/2002 | Tyree |
| 6,363,489 | B1 | 3/2002 | Comay et al. | 2002/0133365 A1 | 9/2002 | Grey et al. |
| 6,370,648 | B1 | 4/2002 | Diep | 2002/0138416 A1 | 9/2002 | Lovejoy et al. |
| 6,373,950 | B1 | 4/2002 | Rowney | 2002/0138755 A1 | 9/2002 | Ko |
| 6,385,655 | B1 | 5/2002 | Smith et al. | 2002/0138759 A1 | 9/2002 | Dutta |
| 6,393,465 | B2 | 5/2002 | Leeds | 2002/0138762 A1 | 9/2002 | Horne |
| 6,393,568 | B1 | 5/2002 | Ranger et al. | 2002/0143963 A1 | 10/2002 | Converse et al. |
| 6,405,318 | B1 | 6/2002 | Rowland | 2002/0147734 A1 | 10/2002 | Shoup et al. |
| 6,442,588 | B1 | 8/2002 | Clark et al. | 2002/0152399 A1 | 10/2002 | Smith |
| 6,442,686 | B1 | 8/2002 | McArdle et al. | 2002/0165971 A1 | 11/2002 | Baron |
| 6,453,345 | B2 | 9/2002 | Trcka et al. | 2002/0169954 A1 | 11/2002 | Bandini et al. |
| 6,460,141 | B1 | 10/2002 | Olden | 2002/0172367 A1 | 11/2002 | Mulder et al. |
| 6,470,086 | B1 | 10/2002 | Smith | 2002/0178227 A1 | 11/2002 | Matsa et al. |
| 6,487,599 | B1 | 11/2002 | Smith et al. | 2002/0178383 A1 | 11/2002 | Hrabik et al. |
| 6,487,666 | B1 | 11/2002 | Shanklin et al. | 2002/0188864 A1 | 12/2002 | Jackson |
| 6,502,191 | B1 | 12/2002 | Smith et al. | 2002/0194469 A1 | 12/2002 | Dominique et al. |
| 6,516,411 | B2 | 2/2003 | Smith | 2002/0199095 A1 | 12/2002 | Bandini et al. |
| 6,519,703 | B1 | 2/2003 | Joyce | 2003/0005326 A1 | 1/2003 | Flemming |
| 6,539,430 | B1 | 3/2003 | Humes | 2003/0009554 A1 | 1/2003 | Burch et al. |
| 6,546,416 | B1 | 4/2003 | Kirsch | 2003/0009693 A1 | 1/2003 | Brock et al. |
| 6,546,493 | B1 | 4/2003 | Magdych et al. | 2003/0009696 A1 | 1/2003 | Bunker, V et al. |
| 6,550,012 | B1 | 4/2003 | Villa et al. | 2003/0009699 A1 | 1/2003 | Gupta et al. |
| 6,574,737 | B1 | 6/2003 | Kingsford et al. | 2003/0014664 A1 | 1/2003 | Hentunen |
| 6,578,025 | B1 | 6/2003 | Pollack et al. | 2003/0023692 A1 | 1/2003 | Moroo |
| 6,609,196 | B1 | 8/2003 | Dickinson, III et al. | 2003/0023695 A1 | 1/2003 | Kobata et al. |
| 6,650,890 | B1 | 11/2003 | Iriam et al. | 2003/0023873 A1 | 1/2003 | Ben-Itzhak |
| 6,654,787 | B1 | 11/2003 | Aronson et al. | 2003/0023874 A1 | 1/2003 | Prokupets et al. |
| 6,675,153 | B1 | 1/2004 | Cook et al. | 2003/0023875 A1 | 1/2003 | Hursey et al. |
| 6,681,331 | B1 | 1/2004 | Munson et al. | 2003/0028803 A1 | 2/2003 | Bunker, V et al. |
| 6,687,687 | B1 | 2/2004 | Smadja | 2003/0033516 A1 | 2/2003 | Howard et al. |
| 6,697,950 | B1 | 2/2004 | Ko | 2003/0033542 A1 | 2/2003 | Goseva-Popstojanova et al. |
| 6,701,440 | B1 | 3/2004 | Kim et al. | 2003/0041264 A1 | 2/2003 | Black et al. |
| 6,704,874 | B1 | 3/2004 | Porras et al. | 2003/0051026 A1 | 3/2003 | Carter et al. |
| 6,711,127 | B1 | 3/2004 | Gorman et al. | 2003/0051163 A1 | 3/2003 | Bidaud |
| 6,711,687 | B1 | 3/2004 | Sekiguchi | 2003/0051168 A1 | 3/2003 | King et al. |
| 6,725,377 | B1 | 4/2004 | Kouznetsov | 2003/0055931 A1 | 3/2003 | Cravo De Almeida et al. |
| 6,732,101 | B1 | 5/2004 | Cook | 2003/0061506 A1 | 3/2003 | Cooper et al. |
| 6,732,157 | B1 | 5/2004 | Gordon et al. | 2003/0065943 A1 | 4/2003 | Geis et al. |

| | | | |
|---|---|---|---|
| 2003/0084280 A1 | 5/2003 | Bryan et al. |
| 2003/0084320 A1 | 5/2003 | Tarquini et al. |
| 2003/0084323 A1 | 5/2003 | Gales |
| 2003/0084347 A1 | 5/2003 | Luzzatto |
| 2003/0088792 A1 | 5/2003 | Card et al. |
| 2003/0093667 A1 | 5/2003 | Dutta et al. |
| 2003/0093695 A1 | 5/2003 | Dutta |
| 2003/0093696 A1 | 5/2003 | Sugimoto |
| 2003/0095555 A1 | 5/2003 | McNamara et al. |
| 2003/0097439 A1 | 5/2003 | Strayer et al. |
| 2003/0097564 A1 | 5/2003 | Tewari et al. |
| 2003/0105976 A1 | 6/2003 | Copeland, III |
| 2003/0110392 A1 | 6/2003 | Aucsmith et al. |
| 2003/0110396 A1 | 6/2003 | Lewis et al. |
| 2003/0115485 A1 | 6/2003 | Milliken |
| 2003/0115486 A1 | 6/2003 | Choi et al. |
| 2003/0123665 A1 | 7/2003 | Dunstan et al. |
| 2003/0126464 A1 | 7/2003 | McDaniel et al. |
| 2003/0126472 A1 | 7/2003 | Banzhof |
| 2003/0135749 A1 | 7/2003 | Gales et al. |
| 2003/0140137 A1 | 7/2003 | Joiner et al. |
| 2003/0140250 A1 | 7/2003 | Taninaka et al. |
| 2003/0145212 A1 | 7/2003 | Crumly |
| 2003/0145225 A1 | 7/2003 | Bruton, III et al. |
| 2003/0145226 A1 | 7/2003 | Bruton, III et al. |
| 2003/0149887 A1 | 8/2003 | Yadav |
| 2003/0149888 A1 | 8/2003 | Yadav |
| 2003/0154393 A1 | 8/2003 | Young |
| 2003/0154399 A1 | 8/2003 | Zuk et al. |
| 2003/0154402 A1 | 8/2003 | Pandit et al. |
| 2003/0158905 A1 | 8/2003 | Petry et al. |
| 2003/0159069 A1 | 8/2003 | Choi et al. |
| 2003/0159070 A1 | 8/2003 | Mayer et al. |
| 2003/0167402 A1 | 9/2003 | Stolfo et al. |
| 2003/0172166 A1 | 9/2003 | Judge et al. |
| 2003/0172167 A1 | 9/2003 | Judge et al. |
| 2003/0172289 A1 | 9/2003 | Soppera |
| 2003/0172291 A1 | 9/2003 | Judge et al. |
| 2003/0172292 A1 | 9/2003 | Judge |
| 2003/0172294 A1 | 9/2003 | Judge |
| 2003/0172301 A1 | 9/2003 | Judge et al. |
| 2003/0172302 A1 | 9/2003 | Judge et al. |
| 2003/0187996 A1 | 10/2003 | Cardina et al. |
| 2003/0212791 A1 | 11/2003 | Pickup |
| 2003/0233328 A1 | 12/2003 | Scott et al. |
| 2004/0015554 A1 | 1/2004 | Wilson |
| 2004/0025044 A1 | 2/2004 | Day |
| 2004/0054886 A1 | 3/2004 | Dickinson et al. |
| 2004/0058673 A1 | 3/2004 | Iriam et al. |
| 2004/0059811 A1 | 3/2004 | Sugauchi et al. |
| 2004/0088570 A1 | 5/2004 | Roberts et al. |
| 2004/0111531 A1 | 6/2004 | Staniford et al. |
| 2004/0139160 A1 | 7/2004 | Wallace et al. |
| 2004/0139334 A1 | 7/2004 | Wiseman |
| 2004/0167968 A1 | 8/2004 | Wilson et al. |
| 2004/0177120 A1 | 9/2004 | Kirsch |
| 2004/0203589 A1 | 10/2004 | Wang et al. |
| 2004/0205135 A1 | 10/2004 | Hallam-Baker et al. |
| 2004/0267893 A1 | 12/2004 | Lin |
| 2005/0021738 A1 | 1/2005 | Goeller et al. |
| 2005/0052998 A1 | 3/2005 | Oliver et al. |
| 2005/0065810 A1 | 3/2005 | Bouron |
| 2005/0102366 A1 | 5/2005 | Kirsch |
| 2005/0262209 A1 | 11/2005 | Yu |
| 2005/0262210 A1 | 11/2005 | Yu |
| 2006/0036727 A1 | 2/2006 | Kurapati et al. |
| 2006/0042483 A1 | 3/2006 | Work et al. |
| 2006/0095404 A1 | 5/2006 | Adelman et al. |
| 2006/0123083 A1 | 6/2006 | Goutte et al. |
| 2006/0212925 A1 | 9/2006 | Shull et al. |
| 2006/0212930 A1 | 9/2006 | Shull et al. |
| 2006/0212931 A1 | 9/2006 | Shull et al. |
| 2006/0230039 A1 | 10/2006 | Shull et al. |
| 2006/0253458 A1 | 11/2006 | Dixon et al. |

FOREIGN PATENT DOCUMENTS

| | | |
|---|---|---|
| EP | 0375138 A2 | 6/1990 |
| EP | 0413537 A2 | 2/1991 |
| EP | 0420779 A2 | 4/1991 |
| EP | 0720333 A2 | 7/1996 |
| EP | 0838774 A2 | 4/1998 |
| EP | 0869652 A2 | 10/1998 |
| EP | 0907120 A2 | 4/1999 |
| EP | 1326376 | 7/2003 |
| EP | 1271846 | 7/2005 |
| GB | 2271002 A | 3/1994 |
| JP | 2000-148276 | 5/2000 |
| JP | 2000-215046 | 8/2000 |
| JP | 2001-028006 | 1/2001 |
| JP | 2004-537075 | 12/2004 |
| JP | 18350870 | 12/2006 |
| KR | 2006-0012137 | 2/2006 |
| KR | 1020060041934 | 5/2006 |
| WO | WO 96/35994 A1 | 11/1996 |
| WO | WO 99/05814 A2 | 2/1999 |
| WO | WO 99/33188 A2 | 7/1999 |
| WO | WO 99/37066 A1 | 7/1999 |
| WO | 00/07312 | 2/2000 |
| WO | WO 00/42748 A1 | 7/2000 |
| WO | WO 01/17165 A2 | 3/2001 |
| WO | WO 01/50691 A2 | 7/2001 |
| WO | WO 01/76181 A2 | 10/2001 |
| WO | WO 01/80480 A1 | 10/2001 |
| WO | WO 01/88834 A2 | 11/2001 |
| WO | WO 02/13469 A2 | 2/2002 |
| WO | WO 02/13489 A2 | 2/2002 |
| WO | WO 02/75547 A1 | 9/2002 |
| WO | WO 02/091706 A1 | 11/2002 |
| WO | WO 2004/061703 | 7/2004 |
| WO | WO 2004081734 | 9/2004 |
| WO | WO 2005116851 | 12/2005 |

OTHER PUBLICATIONS

Article entitled "A Comparison of Two Learning Algorithms for Text Categorization" by Lewis et al., in *Third Annual Symposium on Document Analysis and Information Retrieval*, Apr. 11-13, 1994, pp. 81-92.

Article entitled "Learning Limited Dependence Bayesian Classifiers" by Sahami, in *Proceedings of the Second International Conference on Knowledge Discovery and Data Mining*, 1996, pp. 335-338.

Article entitled "An Evaluation of Phrasal and Clustered Representations on a Text Categorization Task" by Lewis, in *15th Ann Int'l SIGIR*, Jun. 1992, pp. 37-50.

Book entitled *Machine Learning* by Mitchell, 1997, pp. 180-184.

Article entitled "Learning Rules that Classify E-mail" by Cohen, pp. 1-8. Date unknown.

Article entitled "Hierarchically classifying documents using very few words" by Koller et. al., in *Proceedings of the Fourteenth International Conference on Machine Learning*, 1997.

Article entitled "Classification of Text Documents" by Li et. al., in *The Computer Journal*, vol. 41, No. 8, 1998, pp. 537-546.

Article entitled "Issues when designing filters in messaging systems" by Palme et. al., in 19 *Computer Communications*, 1996, pp. 95-101.

Article entitled "Text Categorization with Support Vector Machines: Learning with Many Relevant Features" by Joachins in *Machine Learning: ECML-98*, Apr. 1998, pp. 1-14.

Article entitled "Hierarchical Bayesian Clustering for Automatic Text Classification" by Iwayama et al. in *Natural Language*, pp. 1322-1327. Date unknown.

Article entitled "Smokey: Automatic Recognition of Hostile Messages" by Spertus in *Innovative Applications* 1997, pp. 1058-1065.

Article entitled "A Comparison of Classifiers and Document Representations for the Routing Problem" by Schutze. Date unknown.

Article entitled "CAFE: A Conceptual Model for Managing Information in Electronic Mail" by Takkinen et al. in *Proc. 31st Annual Hawaii International Conference on System Sciences*, 1998, pp. 44-53.

Article entitled "A Comparative Study on Feature Selection in Text Categorization" by Yang et. al. Date unknown.

Article entitled "Spam!" by Cranor et. al. in *Communications of the ACM*, vol. 41, No. 8, Aug. 1998, pp. 74-83.

Article entitled "Sendmail and Spam" by LeFebvre in *Performance Computing*, Aug. 1998, pp. 55-58.

Article entitled "Implementing a Generalized Tool for Network Monitoring" by Ranum et. al. in *LISA XI*, Oct. 26-31, 1997, pp. 1-8.
Article entitled "Method for Automatic Contextual Transposition Upon Receipt of Item of Specified Criteria" printed Feb. 1994 in *IBM Technical Disclosure Bulletin*, vol. 37, No. 2B, p. 333.
Article entitled "Toward Optimal Feature Selection" by Koller et al., in *Machine Learning: Proc. of the Thirteenth International Conference*, 1996.
Website: Technical Focus—Products—Entegrity AssureAccess. www2.entegrity.com.
Website: Create Secure Internet Communication Channels—Atabok Homepage. www.atabok.com.
Website: ATABOK VCNMAIL™ Secure Email Solution—Atabok Related Produces www.atabok.com.
Website: ATABOK VCN Auto-Exchange™—Atabok Related Produces. www.atabok.com.
Website: Controlling Digital Assets Is a Paramount Need for All Business—Atabok Related Produces. www.atabok.com.
Website: Control Your Confidential Communications with ATABOK—Atabok Related Produces. www.atabok.com.
Website: Entrust Entelligence—Entrust Homepage. www.entrust.com.
Website: E-mail Plug-in—Get Technical/Interoperability www.entrust.com—Entrust Entelligence. www.entrust.com.
Webslte: E-mail Plug-in—Get Technical/System www.entrust.com Requirements—Entrust Entelligence. www.entrust.com.
Website: E-mail Plug-in—Features and Benefits—Entrust Entelligence. www.entrust.com.
Website: Internet Filtering Software—Internet Manager Homepage. www.elronsw.com.
Website: ESKE—Email with Secure Key Exchange—ESKE. www.danu.ie.
Website: Terminet—ESKE. www.danu.ie.
Website: Baltimore Focus on e-Security—Baltimore Technologies. www.baltimore.com.
Website: Go Secure! for Microsoft www.verisian.com Exchange—Products/Services—Verisign, Inc. www.verisign.com.
Article entitled "MIMEsweeper defuses virus network, net mail bombs" by Avery, in *Info World*, May 20, 1996, vol. 12, No. 21, p. N1.
Article entitled "Stomping out mail viruses" by Wilkerson, in *PC Week*, Jul. 15, 1996, p. N8.
Article entitled "Securing Electronic Mail Systems" by Serenelli et al., in *Communications-Fusing Command Control and Intelliaence: MILCOM '92*, 1992, pp. 677-680.
Article entitled "Integralis' Minesweeper defuses E-mail bombs" by Kramer et. al., in *PC Week*, Mar. 18, 1996, p. N17-N23.
Article entitled "A Toolkit and Methods for Internet Firewalls" by Ranum et. al., in *Proc. of USENIX Summer 1994 Technical Conference*, Jun. 6-10, 1994, pp. 37-44.
Article entitled "Firewall Systems: The Next Generation" by McGhie, in *Integration Issues in Large Commercial Media Delivery Systems: Proc. of SPIE—The International Society for Optical Engineering*, Oct. 23-24, 1995, pp. 270-281.
Article entitled "Design of the TTI Prototype Trusted Mail Agent" by Rose et. al., in *Computer Message Systems-85: Proc. of the IFIP TC 6 International Symposium on Computer Message Systems*, Sep. 5-7, 1985, pp. 377-399.
Article entitled "Designing an Academic Firewall: Policy, Practice, and Experience with SURF" by Greenwald et. al., in *Proc. of the 1996 Symposium on Network and Distributed Systems Security*, 1996, pp. 1-14.

Article entitled "X Through the Firewall, and Other Application Relays" by Treese et. al. in *Proc. of the USENIX Summer 1993 Technical Conference*, Jun. 21-25, 1993, pp. 87-99.
Article entitled "Firewalls for Sale" by Bryan, in *BYTE*, Apr. 1995, pp. 99-104.
Article entitled "A DNS Filter and Switch for Packet filtering Gateways" by Cheswick et al., in *Proc. of the Sixth Annual USENIX Security Symposium: Focusing on Applications of Cryptography*, Jul. 22-25, 1996, pp. 15-19.
Article entitled "Safe Use of X Window System Protocol Across a Firewall" by Kahn, in *Proc. of the Fifth USENIX UNIX Security Symposium*, Jun. 5-7, 1995, pp. 105-116.
Article entitled "Automating the OSI to Internet Management Conversion Through the Use of an Object-Oriented Platform" by Paviou et al., in *Proc. of the IFIP TC6/WG6.4 International Conference on Advanced Information Processing Techniques for LAN and MAN Management*, Apr. 7-9, 1993, pp. 245-260.
Article entitled "A Secure Email Gateway (Building an RCAS External Interface)" by Smith, in *Tenth Annual Computer Security Applications Conference*, Dec. 5-9, 1994, pp. 202-211.
Article entitled "Secure External References in Multimedia Email Messages" by Wiegel, in *3rd ACM Conference on Computer and Communications Security*, Mar. 14-16, 1996, pp. 11-18.
Memo entitled "SOCKS Protocol Version 5" by Leech et. al., in *Standards Track*, Mar. 1996, pp. 1-9.
Article entitled "Securing the Web: fire walls, proxy servers, and data driven attacks" by Farrow in *InfoWorld*, Jun. 19, 1995, vol. 17, No. 25, p. 103.
Official Action (with uncertified Translation), Japanese Patent Application No. 2003-575222, Sep. 25, 2009, 13 pages.
Ando, Ruo, Real-time neural detection with network capturing, Study report from Information Processing Society of Japan, vol. 2002, No. 12, IPSJ SIG Notes, Information Processing Society of Japan, 2002, Feb. 15, 2002, p. 145-150.
Aikawa, Narichika, Q&A Collection: Personal computers have been introduced to junior high schools and accessing to the Internet has been started; however, we want to avoid the students from accessing harmful information. What can we do?, DOS/V Power Report, vol. 8, No. 5, Japan, Impress Co., Ltd., 1998, May 1, p. 358 to 361.
Shishibori, Masami, et al., "A Filtering Method for Mail Documents Using Personal Profiles", IEICE Technical Report, The Institute of Electronics, Information and Communication Engineers, vol. 98, No. 486, Dec. 17, 1998, pp. 9-16.
Lane, Terran et al., "Sequence Matching and Learning in Anomaly Detection for Computer Security", AAAI Technical Report WS-97-07, 1997, p. 43 to 49.
Supplementary European Search Report for Application No. EP 03723691.6, dated Jun. 28, 2010, 6 pages.
Office Action for Application No. EP 03723691.6, dated Oct. 12, 2010, 6 pages.
Abika.com, "Trace IP address, email or IM to owner or user" http://www.abika.com/help/IPaddressmap.htm, 3 pp. (Jan. 25, 2006).
Abika.com, "Request a Persons Report", http://www.abika.com/forms/Verifyemailaddress.asp, 1 p. (Jan. 26, 2006).
First/Consequent Examination Report for IN Application No. 2639/DELNP/2004, dated Apr. 8, 2011, 3 pages.

* cited by examiner

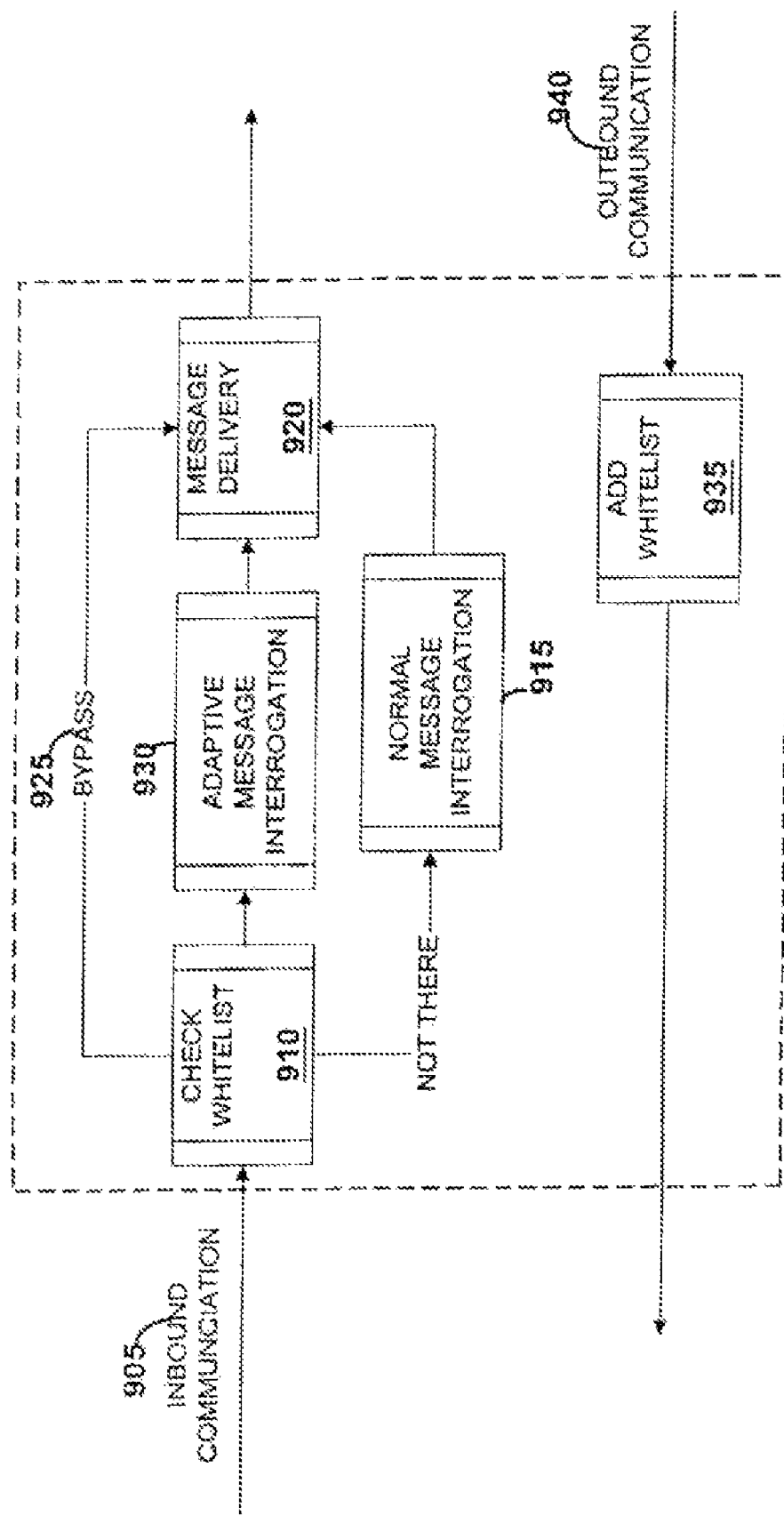

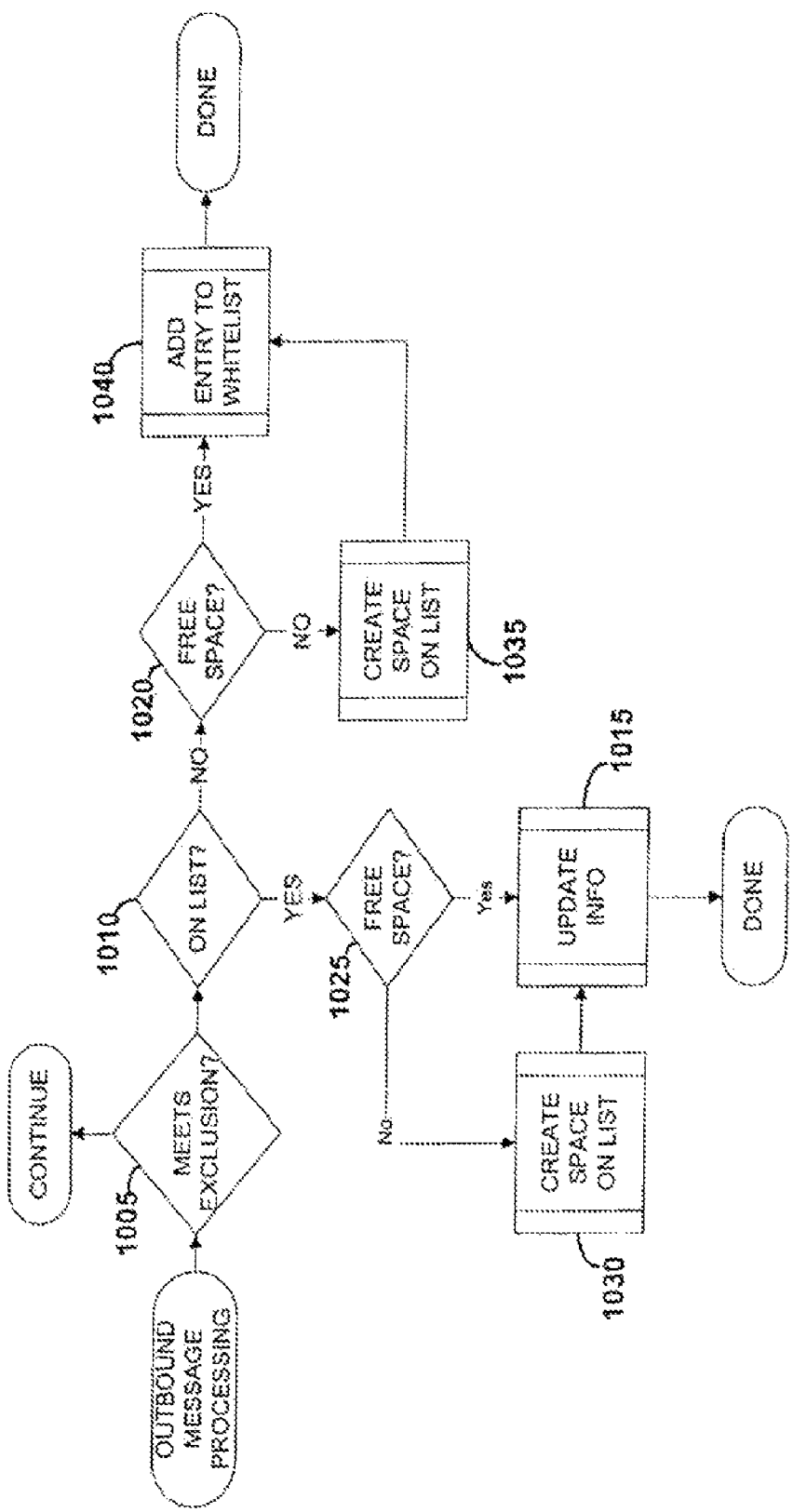

SYSTEMS AND METHODS FOR MESSAGE THREAT MANAGEMENT

CROSS-REFERENCE TO RELATED PATENT APPLICATIONS

This application is a continuation of U.S. patent application No. 10/361,091, filed Feb. 7, 2003 and incorporated herein by reference, which is a continuation-in-part of commonly assigned U.S. patent application Nos. 10/093,553; 10/094,211; and 10/094,266 all filed on Mar. 8, 2002, which are hereby incorporated herein in their entirety.

BACKGROUND

The present invention is directed to systems and methods for receiving information related to messaging threats, processing the information, and generating rules and policies in response to those threats. More specifically, without limitation, the present invention relates to computer-based systems and methods for responding to a range of threats to messaging systems including viruses, spam, worms, and other attacks on the server software.

The Internet is a global network of connected computer networks. Over the last several years, the Internet has grown in significant measure. A large number of computers on the Internet provide information in various forms. Anyone with a computer connected to the Internet can potentially tap into this vast pool of information.

The information available via the Internet encompasses information available via a variety of types of application layer information servers such as SMTP (simple mail transfer protocol), POP3 (Post Office Protocol), GOPHER (RFC 1436), WAIS, HTTP (Hypertext Transfer Protocol, RFC 2616) and FTP (file transfer protocol, RFC 1123).

One of the most wide spread method of providing information over the Internet is via the World Wide Web (the Web). The Web consists of a subset of the computers connected to the Internet; the computers in this subset run Hypertext Transfer Protocol (HTTP) servers (Web servers). Several extensions and modifications to HTTP have been proposed including, for example, an extension framework (RFC 2774 ) and authentication (RFC 2617). Information on the Internet can be accessed through the use of a Uniform Resource Identifier (URI, RFC 2396). A URI uniquely specifies the location a particular piece of information on the Internet. A URI will typically be composed of several components. The first component typically designates the protocol by which the address piece of information is accessed (e.g., HTTP, GOPHER, etc.). This first component is separated from the remainder of the URI by a colon (':'). The remainder of the URI will depend upon the protocol component. Typically, the remainder designates a computer on the Internet by name, or by IP number, as well as a more specific designation of the location of the resource on the designated computer. For instance, a typical URI for an HTTP resource might be:

http://www.server.com/dir1/dir2/resource.htm where http is the protocol, www.server.com is the designated computer and /dir1/dir2/resource.htm designates the location of the resource on the designated eomputer. The term URI includes Uniform Resource Names (URN's) including URN's as defiend according to RFC 2141.

Web servers host information in the form of Web pages; collectively the server and the information hosted are referred to as a Web site. A significant number of Web pages are encoded using the Hypertext Markup Language (HTML) although other encodings using eXtensible Markup Language (XML) or XHTML. The published specifications for these languages are incorporated by reference herein; such specifications are available from the World Wide Web Consortium and its Web site (http://www.w3c.org). Web pages in these formatting languages may include links to other Web pages on the same Web site or another. As will be known to those skilled in the art, Web pages may be generated dynamically by a server by integrating a variety of elements into a formatted page prior to transmission to a Web client. Web servers, and information servers of other types, await requests for the information from Internet clients.

Client software has evolved that allows users of computers connected to the Internet to access this information. Advanced clients such a Netscape's Navigator and Microsoft's Internet Explorer allow users to access software provided via a variety of information servers in a unified client environment. Typically, such client software is referred to as browser software.

Electronic mail (e-mail) is another wide spread application using the Internet. A variety of protocols are often used for e-mail transmission, delivery and processing including SMTP and POP3 as discussed above. These protocols refer, respectively, to standards for communicating e-mail messages between servers and for server-client communication related to e-mail messages. These protocols are defined respectively in particular RFC's (Request for Comments) promulgated by the IETF (Internet Engineering Task Force). The SMTP protocol is defined in RFC 821, and the POP3 protocol is defined in RFC 1939.)

Since the inception of these standards, various needs have evolved in the field of e-mail leading to the development of further standards including enhancements or additional protocols. For instance, various enhancements have evolved to the SMTP standards leading to the evolution of extended SMTP. Examples of extensions may be seen in (1) RFC 1869 that defines a framework for extending the SMTP service by defining a means whereby a server SMTP can inform a client SMTP as to the service extensions it supports and in (2) RFC 1891 that defines an extension to the SMTP service, which allows an SMTP client to specify (a) that delivery status notifications (DSNs) should be generated under certain conditions, (b) whether such notifications should return the contents of the message, and (c) additional information, to be returned with a DSN, that allows the sender to identify both the recipient(s) for which the DSN was issued, and the transaction in which the original message was sent.

In addition, the IMAP protocol has evolved as an alternative to POP3 that supports more advanced interactions between e-mail servers and clients. This protocol is described in RFC 2060.

The various standards discussed above by reference to particular RFC's are hereby incorporated by reference herein for all purposes. These RFC's are available to the public through the IETF and can be retrieved from its Web site (http://www.ietf.org/rfc.html). The specified protocols are not intended to be limited to the specific RFC's quoted herein above but are intended to include extensions and revisions thereto. Such extensions and/or revisions may or may not be encompassed by current and/or future RFC's.

A host of e-mail server and client products have been developed in order to foster e-mail communication over the Internet. E-mail server software includes such products as sendmail-based servers, Microsoft Exchange, Lotus Notes Server, and Novell Group Wise; sendmail-based servers refer to a number of variations of servers originally based upon the sendmail program developed for the UNIX operating systems. A large number of e-mail clients have also been developed that allow a user to retrieve and view e-mail messages from a server; example products include Microsoft Outlook, Microsoft Outlook Express, Netscape Messenger and Eudora. In addition, since e-mail servers, or e-mail servers in conjunction with a Web server, allow a Web browser to act as an e-mail client using the HTTP standard.

As the Internet has become more widely used, it has also created new risks for corporations. Breaches of computer security by hackers and intruders and the potential for compromising sensitive corporate information are a very real and serious threat. Organizations have deployed some or all of the following security technologies to protect their networks from Internet attacks:

Firewalls have been deployed at the perimeter of corporate networks. Firewalls act as gatekeepers and allow only authorized users to access a company network. Firewalls play an important role in controlling traffic into networks and are an important first step to provide Internet security.

Intrusion detector systems (IDS) are being deployed throughout corporate networks. While the firewall acts as a gatekeeper, IDS acts like a video camera. IDS monitor network traffic for suspicious patterns of activity, and issue alerts when that activity is detected. IDS proactively monitor your network 24 hours a day in order to identify intruders within a corporate or other local network.

Firewall and IDS technologies have helped corporations to protect their networks and defend their corporate information assets. However, as use of these devices has become widespread, hackers have adapted and are now shifting their point-of-attack from the network to Internet applications. The most vulnerable applications are those that require a direct "always-open" connection with the Internet such as web and e-mail. As a result, intruders are launching sophisticated attacks that target security holes within these applications.

Many corporations have installed a network firewall, as one measure in controlling the flow of traffic in and out of corporate computer networks, but when it comes to Internet application communications such as e-mail messages and Web requests and responses, corporations often allow employees to send and receive from or to anyone or anywhere inside or outside the company. That is done by opening a port, or hole in their firewall (typically, port 25 for e-mail and port 80 for Web), to allow the flow of traffic. Firewalls do not scrutinize traffic flowing through this port. This is similar to deploying a security guard at a company's entrance but allowing anyone who looks like a serviceman to enter the building. An intruder can pretend to be a serviceman, bypass the perimeter security, and compromise the serviced Internet application.

FIG. 1 depicts a typical prior art server access architecture. With in a corporation's local network 190, a variety of computer systems may reside. These systems typically include application servers 120 such as Web servers and e-mail servers, user workstations running local clients 130 such as e-mail readers and Web browsers, and data storage devices 110 such as databases and network connected disks. These systems communicate with each other via a local communication network such as Ethernet 150. Firewall system 140 resides between the local communication network and Internet 160. Connected to the Internet 160 are a host of external servers 170 and external clients 180.

Local clients 130 can access application servers 120 and shared data storage 110 via the local communication network. External clients 180 can access external application servers 170 via the Internet 160. In instances where a local server 120 or a local client 130 requires access to an external server 170 or where an external client 180 or an external server 170 requires access to a local server 120, electronic communications in the appropriate protocol for a given application server flow through "always open" ports of firewall system 140.

The security risks do not stop there. After taking over the mall server, it is relatively easy for the intruder to use it as a launch pad to compromise other business servers and steal critical business information. This information may include financial data, sales projections, customer pipelines, contract negotiations, legal matters, and operational documents. This kind of hacker attack on servers can cause immeasurable and irreparable losses to a business.

In the 1980's, viruses were spread mainly by floppy diskettes. In today's interconnected world, applications such as e-mail serve as a transport for easily and widely spreading viruses. Viruses such as "I Love You" use the technique exploited by distributed Denial of Service (DDoS) attackers to mass propagate. Once the "I Love You" is received, the recipient's Microsoft Outlook sends e-mails carrying viruses to everyone in the Outlook address book. The "I Love You" virus infected millions of computers within a short time of its release. Trojan horses, such as Code Red use this same technique to propagate themselves. Viruses and Trojan horses can cause significant lost productivity due to down time and the loss of crucial data.

The Nimda worm simultaneously attacked both email and web applications. It propagated itself by creating and sending infectious email messages, infecting computers over the network and striking vulnerable Microsoft HS Web servers, deployed on Exchange mail servers to provide web mail.

Most e-mail and Web requests and responses are sent in plain text today, making it just as exposed as a postcard. This includes the e-mail message, its header, and its attachments, or in a Web context, a user name and password and/or cookie information in an HTTP request. In addition, when you dial into an Internet Service Provider (ISP) to send or receive e-mail messages, the user ID and a password are also sent in plain text, which can be snooped, copied, or altered. This can be done without leaving a trace, making it impossible to know whether a message has been compromised.

As the Internet has become more widely used, it has also created new troubles for users. In particular, the amount of "spam" received by individual users has increased dramatically in the recent past. Spam, as used in this specification, refers to any communication receipt of which is either unsolicited or not desired by its recipient.

The following are additional security risks caused by Internet applications:

E-mail spamming consumes corporate resources and impacts productivity. Furthermore, spammers use a corporation's own mail servers for unauthorized email relay, making it appear as if the message is coming from that corporation.

E-mail and Web abuse, such as sending and receiving inappropriate messages and Web pages, are creating liabilities for corporations. Corporations are increasingly facing litigation for sexual harassment or slander due to e-mail their employees have sent or received.

Regulatory requirements such as the Health Insurance Portability and Accountability Act (HIPAA) and the Gramm-Leach-Bliley Act (regulating financial institutions) create liabilities for companies where confidential patient or client information may be exposed in e-mail and/or Web servers or communications including e-mails, Web pages and HTTP requests.

Using the "always open" port, a hacker can easily reach an appropriate Internet application server, exploit its vulnerabilities, and take over the server. This provides hackers easy access to information available to the server, often including sensitive and confidential information. The systems and methods according to the present invention provide enhanced security for communications involved with such Internet applications requiring an "always-open" connection.

Anti-spam systems in use today include fail-open systems in which all incoming messages are filtered for spam. In these systems, a message is considered not to be spam until some form of examination proves otherwise. A message is determined to be spam based on an identification technique. Operators of such systems continue to invest significant resources in efforts to reduce the number of legitimate messages that are misclassified as spam. The penalties for any misclassification are significant and therefore most systems are designed to be predisposed not to classify messages as spam.

One such approach requires a user to explicitly list users from whom email is desirable. Such a list is one type of "whitelist". There are currently two approaches for creating such a whitelist. In a desktop environment, an end-user can import an address book as the whitelist. This approach can become a burden when operated at a more central location such as the gateway of an organization. Therefore, some organizations only add a few entries to the whitelist as necessary. In that case, however, the full effect of whitelisting is not achieved. The present invention improves upon these systems by including a system that allows a more effective solution for whitelisting while requiring reduced manual effort by end-users or administrators. The present invention also allows a whitelist system to be strengthened by authenticating sender information.

Other systems in use today employ a fail-closed system in which a sender must prove its legitimacy. A common example of this type of system uses a challenge and response. Such a system blocks all messages from unknown senders and itself sends a confirmation message to the sender. The sender must respond to verify that it is a legitimate sender. If the sender responds, the sender is added to the whitelist. However, spammers can create tools to respond to the confirmation messages. Some confirmation messages are more advanced in an effort to require that a human send the response. The present invention is an improvement upon these systems. The present invention can reference information provided by users to determine who should be whitelisted rather than rely on the sender's confirmation. The systems and methods according to the present invention provide enhanced accuracy in the automated processing of electronic communications.

U.S. Pat. No. 6,052,709, the disclosure of which is incorporated herein by this reference, assigned to Bright Light Technologies discloses a system for collecting spam messages so that rules can be created and sent to servers. The disclosed system includes the steps of data collection, rule creation, and distribution of rules to clients. The disclosed system is directed to a particular method of data collection for spam messages. No system or method for creating rules based on input data are disclosed. Nor does it disclose a systematic approach to generating rules. Furthermore, the disclosed system is limited to spam threats and only allows one type of input. The threat management center of the present invention is operative on all messaging threats including, but not limited to, spam, virus, worms, Trojans, intrusion attempts, etc. The threat management center of the present invention also includes novel approaches to the process of rule creation. Additionally, the present invention improves on the state of the art by providing a more generalized and useful data collection approach. The data collection system of the present invention includes modules that process input into data that can be used by the rule creation process. The present invention can also use feedback from application layer security servers as input to the rule creation process.

U.S. patent application Ser. No. 10/154,137 (publication 2002/0199095 A1), the disclosure of which is incorporated herein by this reference, discloses a system for message filtering. The disclosed system allows spam messages to be forwarded to a database by users of the system. In contrast, the systems and methods of the present invention do not rely on the users; rather the messaging security system(s) can automatically determine spam using identification techniques and then forward the results to a database. The system of the present invention can add known spam messages as well as misclassified messages forwarded by users to the database to retrain the system. Systems known in the art require the forwarding of entire messages in the databases. In the present invention, individual messaging or application layer security systems can extract meaningful features from spam messages, threatening messages and/or non-spam/non-threatening messages and forward only relevant features to a database.

U.S. Pat. No. 6,161,130, the disclosure of which is incorporated herein by this reference, discloses a technique for detecting "junk" email. The disclosed system is operative only on spam and not the entire class of messaging security threats. The inputs for the disclosed system are limited spam and non-spam e-mail. This patent discloses text analysis based features such as the tokens in a message. This patent discloses "predefined handcrafted distinction" but does not further disclose what they are or how these can be created. The system of the present invention can classify based on not only the text analysis but also other features of messages. Additionally, the system of the present invention can include fully automated feature extraction for non-text based features.

In addition, known security systems have been developed to provide peer-to-peer communication of threat information. Such systems are typically designed for a ring of untrusted peers and therefore addresses trust management between the peers. Additionally, current peer-to-peer systems do not have a central entity. The system of the present invention operates between a set of trusted peers, therefore, trust management need not be addressed by the present invention. Further, a centralized threat management system coordinates threat information among multiple trusted application layer security systems communicating in a peer-to-peer manner. Therefore, the threat notification system can process more real-time data exchange. This makes the distributed IDS (intrusion detection system) more scalable.

In addition, current systems only exchange instrusion alerts. These systems can only notify each other of attacks of which they are aware. While the underlying detection method could be misuse or anomaly detection, the data exchanged is only the detected attack information. The system of the present invention distributes more general information about traffic patterns as well as specific threat information. As a non-limiting example, if anomaly detection is used, the system of the present invention can exchange the underlying statistics instead of waiting for the statistics to indicate an attack. Exchanged statistics can include information about the frequency of certain attacks. Therefore, even if other systems already have a signature for a certain attack, the system of the present invention will notify them of an outbreak of this attack. Additionally, traffic patterns can be exchanged among peers and that information can be further processed by the other peers to infer a global view of traffic patterns. This information exchange can be similar to routing protocols that allow each node to infer a global view of the network topology.

SUMMARY

The present invention is directed to systems and methods for messaging threat protection. A typical architecture includes the following components: 1) a centralized threat management center that can collect threat information and create rules and/or policies for messaging security systems, 2) a peer-to-peer based messaging notification system that is operative between messaging security systems, and 3) a hierachical messaging pushback system that blocks communications as close as possible to the source by sending notifications to systems on a path towards the source.

A preferred embodiment according to the present invention for a threat management center, a threat pushback system or a peer-to-peer application layer security system communication environment each alone, or as an overall environment, include a system data store (SDS), a system processor and one or more interfaces to one or more communications networks over which electronic communications are transmitted and received. The SDS stores data needed to provide the desired system functionality and may include, for example, received communications, data associated with such communications, information related to known security risks, information related to corporate policy with respect to communications for one or more applications (e.g., corporate e-mail policy, Web access guidelines, message interrogation parameters, and whitelists) and predetermined responses to the identification of particular security risks, situations or anomalies.

The SDS may include multiple physical and/or logical data stores for storing the various types of information. Data storage and retrieval functionality may be provided by either the system processor or data storage processors associated with the data store. The system processor is in communication with the SDS via any suitable communication channel(s); the system processor is in communication with the one or more interfaces via the same, or differing, communication channel(s). The system processor may include one or more processing elements that provide electronic communication reception, transmission, interrogation, analysis and/or other functionality.

In a threat management center, the SDS may further include one or more sets of threat management goals and/or one or more sets of test data. Accordingly, one preferred threat management method includes a variety of steps that may, in certain embodiments, be executed by the environment summarized above and more fully described below or be stored as computer executable instructions in and/or on any suitable combination of computer-readable media. Threat information is received from one or more sources; such sources can include external security databases and threat information data from one or more application and/or network layer security systems. The received threat information is reduced into a canonical form. Features are extracted from the reduced threat information; these features in conjunction with configuration data such as goals are used to produce rules. In some embodiments, these rules are tested against one or more sets of test data and compared against the same or different goals; if one or more tests fail, the rules are refined until the tests succeed within an acceptable margin of error. The rules are then propagated to one or more application layer security systems.

One preferred threat pushback method includes a variety of steps that may, in certain embodiments, be executed by the environment summarized above and more fully described below or be stored as computer executable instructions in and/or on any suitable combination of computer-readable media. A communication is received. A threat profile associated with the received communication is generated. In some cases the generation occurs through application of one or more tests to the received communication, wherein each of the one or more tests evaluates the received communication for a particular security risk. In other instance, a manual entry of a threat profile via a provided interface serves to generate the threat profile. The threat profile is compared with configuration information. Typically, configuration information can include threat types of interest and weights associated therewith. In some embodiments, the comparison is accomplished by calculating a threat value from the threat profile and determining whether the threat value satisfies a predetermined threat condition. If the comparison indicates the received communication represents a threat, one or more computer addresses in a back path of the received communication are identified, and information based upon the stored threat profile is outputted.

Some embodiments, identified address along the back path are authenticated prior to propagation of threat information. In other embodiments, an interface may be provided to allow establishing configuration information regarding one or more threat types, wherein configuration information comprises threat types of interest and weights associated therewith.

Accordingly, one preferred method of whitelist usage includes a variety of steps that may, in certain embodiments, be executed by the environment summarized above and more fully described below or be stored as computer executable instructions in and/or on any suitable combination of computer-readable media. In some embodiments, an electronic communication directed to or originating from an application server is received. The source of the electronic communication may be any appropriate internal or external client or any appropriate internal or external application server. One or more tests are applied to the received electronic communication to evaluate the received electronic communication for a particular security risk. A risk profile associated with the received electronic communication is stored based upon this testing. The stored risk profile is compared against data accumulated from previously received electronic communications to determine whether the received electronic communication is anomalous. If the received communication is determined to be anomalous, an anomaly indicator signal is output. The output anomaly indicator signal may, in some embodiments, notify an application server administrator of the detected anomaly by an appropriate notification mechanism (e.g., pager, e-mail, etc.) or trigger some corrective measure such as shutting down the application server totally, or partially (e.g., deny access to all communications from a particular source).

Some embodiments may provide support for communicating information based upon the stored risk profile to a threat notification system to a further security appliance or further security appliance. Without limitation, such security appliances can include threat management centers and other application layer security systems. Such communication of information can be instead of, or in addition to, any anomaly indicator signal. In some embodiments, anomaly detection need not occur nor does an anomaly indicator signal need to be output.

In some embodiments, an electronic communication directed to or originating from an email server is received. One or more tests can be applied to the received electronic communication to compare the sender's address in the received electronic communication to addresses contained in one or more whitelists.

Some embodiments may also support a particular approach to testing the received electronic communication, which may also be applicable for use in network level security and intrusion detection. In such embodiments, each received communication is interrogated by a plurality of interrogation engines where each such interrogation engine is of a particular type designed to test the communication for a particular security risk. Each received communication is interrogated by a series of interrogation engines of differing types. The ordering and selection of interrogation engine types for use with received communications may, in some embodiments, be configurable, whereas in others the ordering and selection may be fixed.

Associated with each interrogation engine is a queue of indices for communications to be evaluated by the particular interrogation engine. When a communication is received, it is stored and assigned an index. The index for the receive communication is place in a queue associated with an interrogation of a particular type as determined by the interrogation engine ordering. Upon completion of the assessment of the received communication by the interrogation engine associated with the assigned queue, the index is assigned to a new queue associated with an interrogation engine of the next type as determined by the interrogation engine ordering. The assignment process continues until the received communication has been assessed by an interrogation engine of each type as determined by the interrogation engine selection. If the communication successfully passes an interrogation engine of each type, the communication is forwarded to its appropriate destination. In some embodiments, if the communication fails any particular engine, a warning indicator signal may be output; in some such embodiments, the communication may then be forwarded with or without an indication of its failure to its appropriate destination, to an application administrator and/or both.

In some embodiments using this queuing approach, the assignment of an index for a received communication to a queue for an interrogation engine of a particular type may involve an evaluation of the current load across all queues for the particular interrogation engine type. If a threshold load exists, a new instance of an interrogation engine of the particular type may be spawned with an associated index queue. The index for the received communication may then be assigned to the queue associated with the interrogation engine instance. In some embodiments, the load across the queues associated with the particular type may be redistributed across the queues including the one associated with the new interrogation engine instance prior to the assignment of the index associated with the newly received communication to the queue. Some embodiments may also periodically, or at particular times such as a determination that a particular queue is empty, evaluate the load across queues for a type of interrogation engine and if an inactivity threshold is met, shutdown excess interrogation instances of that type and disassociating or deallocating indices queues associated with shutdown instances.

Alternatively, a fixed number of interrogation engines of each particular type may be configured in which case dynamic instance creation may or may not occur. In fixed instance embodiments not supporting dynamic instance creation, assignment to a particular queue may result from any appropriate allocation approach including load evaluation or serial cycling through queues associated with each interrogation engine instance of the particular type desired.

In some embodiments, anomaly detection may occur through a process outlined as follows. In such a process, data associated with a received communication is collected. The data may be accumulated from a variety of source such as from the communication itself and from the manner of its transmission and receipt. The data may be collected in any appropriate manner such as the multiple queue interrogation approach summarized above and discussed in greater detail below. Alternatively, the data collection may result from a parallel testing process where a variety of test is individually applied to the received communication in parallel. In other embodiments, a single combined analysis such as via neural network may be applied to simultaneously collect data associated with the received communication across multiple dimensions.

The collected data is then analyzed to determine whether the received communication represents an anomaly. The analysis will typically be based upon the collected data associated with the received communication in conjunction with established communication patterns over a given time period represented by aggregated data associated with previously received communications. The analysis may further be based upon defined and/or configurable anomaly rules. In some embodiments, analysis may be combined with the data collection; for instance, a neural network could both collect the data associated with the received communication and analyze it.

The adaptive communication interrogation can use established communication patterns over a given time period represented by aggregated data associated with previously received communications. The analysis can further be based upon defined and/or configurable spam rules. In some embodiments, analysis can be combined with the data collection; for instance, a neural network could both collect the data associated with the received communication and analyze it.

Finally, if an anomaly is detected with respect to the received communication, an indicator signal is generated. The generated signal may provide a warning to an application administrator or trigger some other appropriate action. In some embodiments, the indicator signal generated may provide a generalized indication of an anomaly; in other embodiments, the indicator may provide additional data as to a specific anomaly, or anomalies, detected. In the latter embodiments, any warning and/or actions resulting from the signal may be dependent upon the additional data.

Data collected from received communications can be analyzed to determine whether the received communication is on one or more whitelists. The analysis is typically based upon the collected data associated with the received communication in conjunction with reference to one or more whitelists. If no match to a whitelist is found, the communication can be subject to a certain level of interrogation. If a match to the whitelist is found, the communication can either bypass any message interrogation or it can be subject to a different level of interrogation. In one preferred embodiment, if a match to a whitelist is found, the message can be subject to either adaptive message interrogation or no message interrogation. If no match to a whitelist is found, the message can be subject to normal message interrogation. Additionally, a whitelist can be created and/or updated based on outbound communication. In one preferred embodiment, some or all of the destination addresses of outbound communications are added to a whitelist. If a destination address already appears on a whitelist, a confidence value associated with the destination can be modified based upon the destination address' presence. For instance, a usage count may be maintained; such a usage count can reflect absolute usage of the address or usage of the address over a given period of time.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 9 is a flow chart of an exemplary communication assessment process according to the present invention.

FIG. 10 is a flow chart of an exemplary whitelist management process according to the present invention.

DETAILED DESCRIPTION

Figure 1:
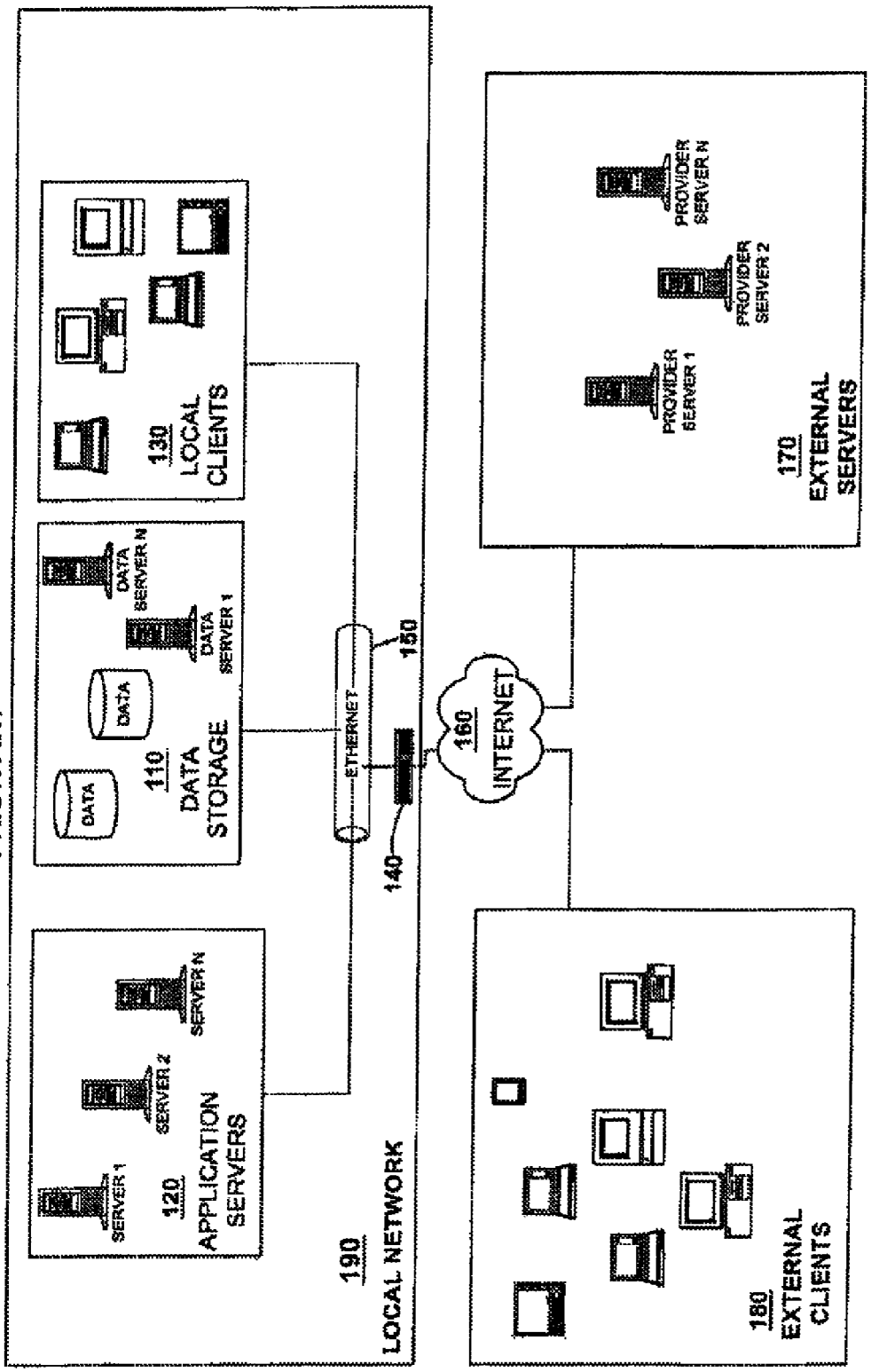
FIG. 1 depicts a typical prior art access environment.

Exemplary embodiments of the present invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follows, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Architecture of a Typical Access Environment

Figure 12:
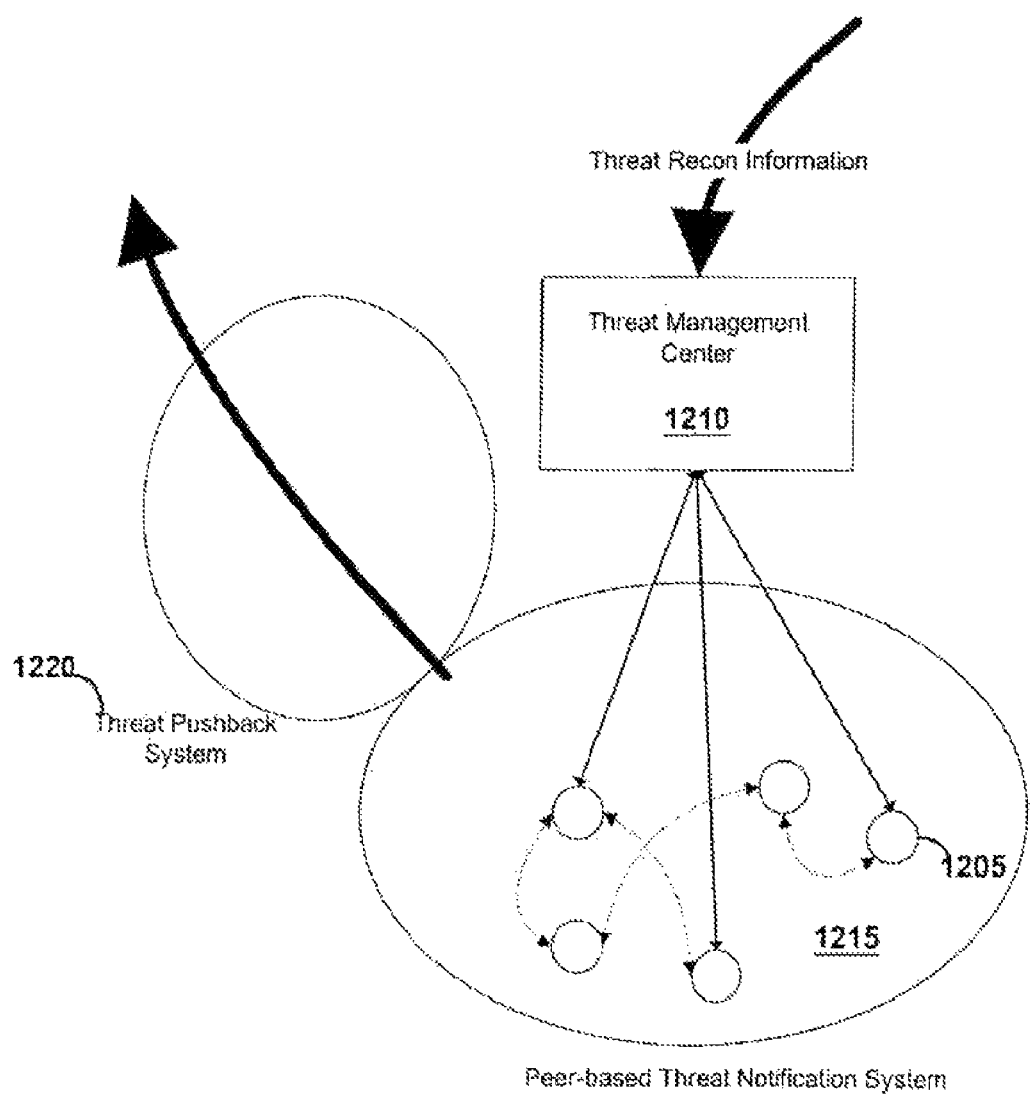
FIG. 12 depicts an overview of information flow through one preferred embodiment of the threat management architecture.

FIG. 12 depicts an overview of information flow through one environment using various aspect of the threat management architecture of the present invention. At the Message Security System (MSS) (e.g., 1205), statistics can be collected based on traffic and threat patterns. The statistics can be processed locally by an individual MSS, or they can be processed by an external processor. An MSS is an example of an application layer security system such a hardware device 210. Detailed information can be sent from one or more MSS back to the Threat Management Center (TMC) 1210. In some embodiments, information can be shared among MSSs in the network. In some embodiments, a plurality of MSSs may operate as a peer-to-peer system 1215. In a preferred embodiment, information gathered and/or computed statistics can be sent from a MSS 1205 to the threat notification and pushback system 1220.

Application Layer Security System

Figure 15:
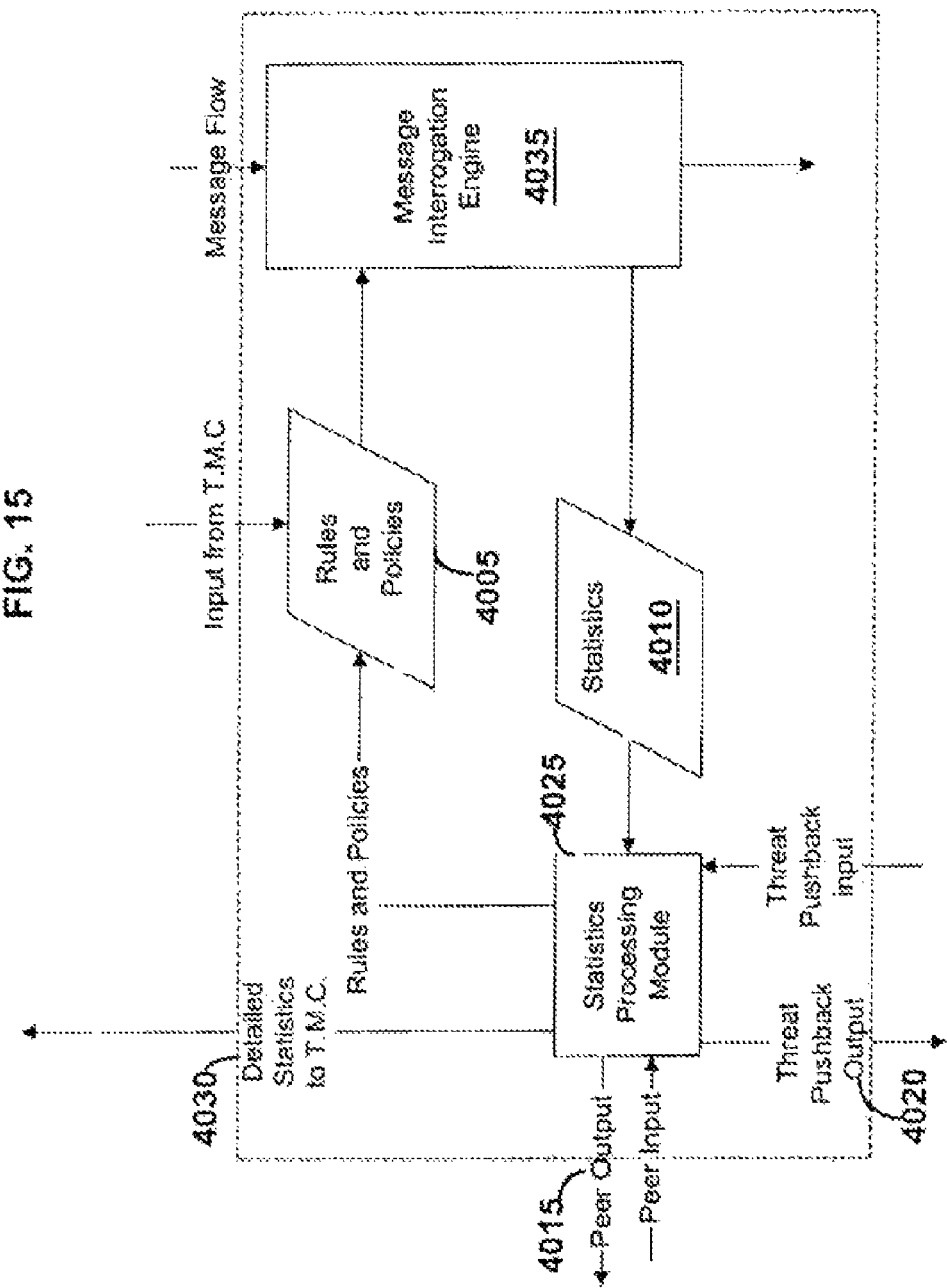
FIG. 15 depicts components of a typical individual Messaging Security System (or application layer security system) according to the present invention.

FIG. 15 depicts message flow through an exemplary Message Interrogation Engine (MIE) 4035, described in greater detail herein below. The MIE can use rules and policies to perform interrogation. Input from the TMC can be added to the set of rules and policies 4005. The MIE produces a set of statistics 4010 based on its recorded history. The statistics processing module (SPM) 4025 can process this information and prepare it for distribution. Certain information can be sent back to the TMC for analysis 4030. Information can be sent to and from peers 4015 as part of the peer-based threat notification system. Information is also pushed to towards the source using the threat pushback system 4020. The SPM 4010 can also receive input from the peer-based threat notification system and the threat pushback system. Based on its history and analysis, the SPM 4010 can create new rules and policies 4005 for the local MIE.

Figure 2:
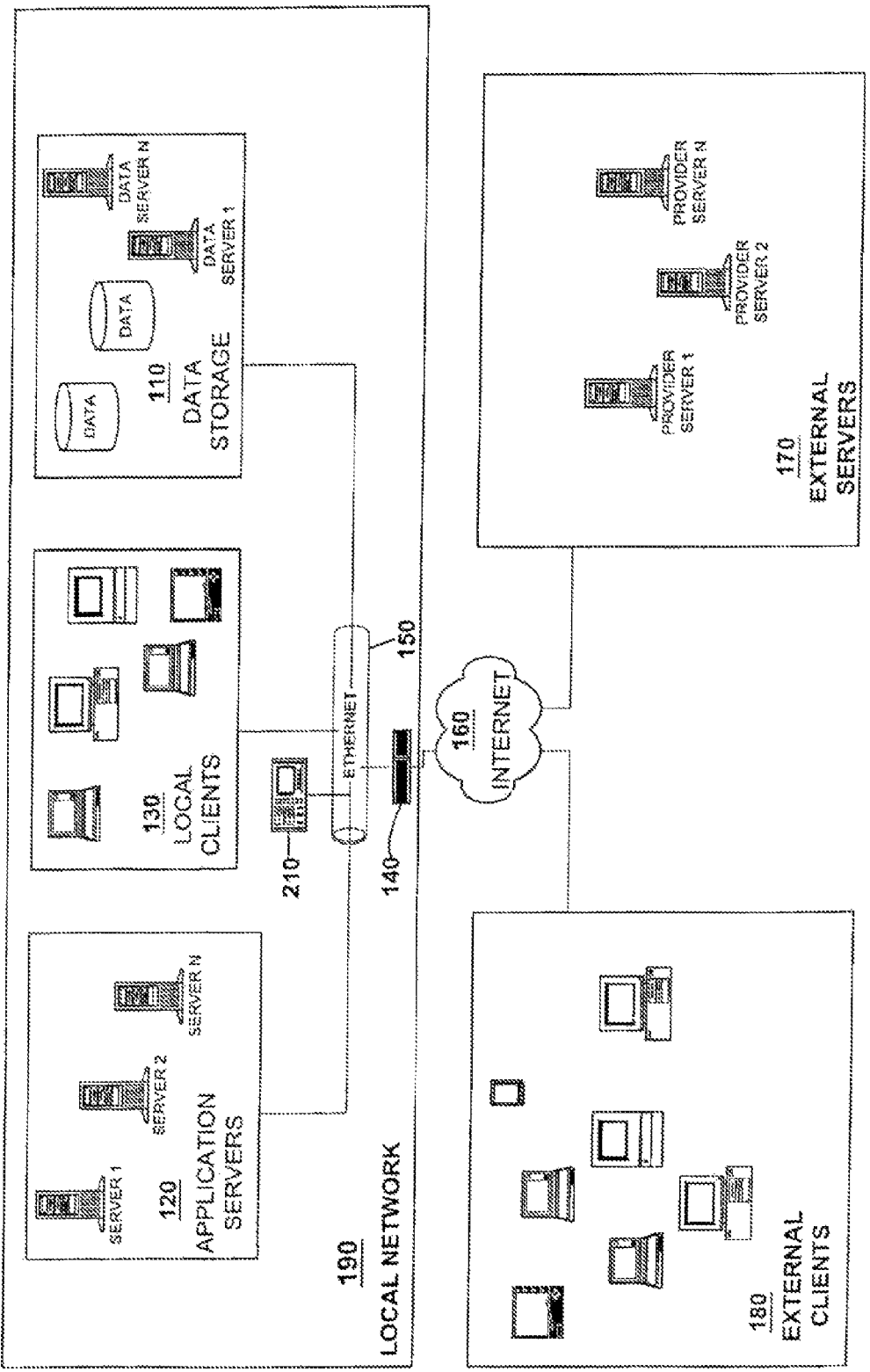
FIG. 2 depicts a hardware diagram for an environment using one preferred embodiment according to the present invention.

FIG. 2 depicts a typical environment according to the present invention. As compared with FIG. 1, the access environment using systems and methods according to the present invention may include a hardware device 210 connected to the local communication network such as Ethernet 180 and logically interposed between the firewall system 140 and the local servers 120 and clients 130. All application related electronic communications attempting to enter or leave the local communications network through the firewall system 140 are routed to the hardware device 210 for application level security assessment and/or anomaly detection. Hardware device 210 need not be physically separate from existing hardware elements managing the local communications network. For instance, the methods and systems according to the present invention could be incorporated into a standard firewall system 140 or router (not shown) with equal facility. In environment not utilizing a firewall system, the hardware device 210 may still provide application level security assessment and/or anomaly detection.

For convenience and exemplary purpose only, the foregoing discussion makes reference to hardware device 210; however those skilled in the art will understand that the hardware and/or software used to implement the systems and methods according to the present invention may reside in other appropriate network management hardware and software elements. Moreover, hardware device 210 is depicted as a single element. In various embodiments, a multiplicity of actual hardware devices may be used. Multiple devices that provide security enhancement for application servers of a particular type such as e-mail or Web may be used where communications of the particular type are allocated among the multiple devices by an appropriate allocation strategy such a (1) serial assignment that assigns a communication to each device sequentially or (2) via the use of a hardware and/or software load balancer that assigns a communication to the device based upon current device burden. A single device may provide enhanced security across multiple application server types, or each device may only provide enhanced security for a single application server type.

In one embodiment, hardware device 210 may be a rack-mounted Intel-based server at either 1U or 2U sizes. The hardware device 210 can be configure with redundant components such as power supplies, processors and disk arrays for high availability and scalability. The hardware device 210 may include SSL/TLS accelerators for enhanced performance of encrypted messages.

The hardware device 210 will include a system processor potentially including multiple processing elements where each processing element may be supported via Intel-compatible processor platforms preferably using at least one PENTIUM III or CELERON (Intel Corp., Santa Clara, Calif.) class processor; alternative processors such as UltraSPARC (Sun Microsystems, Palo Alto, Calif.) could be used in other embodiments. In some embodiments, security enhancement functionality, as further described below, may be distributed across multiple processing elements. The term processing element may refer to (1) a process running on a particular piece, or across particular pieces, of hardware, (2) a particular piece of hardware, or either (1) or (2) as the context allows.

The hardware device 210 would have an SDS that could include a variety of primary and secondary storage element. In one preferred embodiment, the SDS would include RAM a part of the primary storage, the amount of RAM might range from 128 MB to 4 GB although these amounts could vary and represent overlapping use such as where security enhancement according to the present invention is integrated into a firewall system. The primary storage may in some embodiments include other forms of memory such a cache memory, registers, non-volatile memory (e.g., FLASH, ROM, EPROM, etc.), etc.

The SDS may also include secondary storage including single, multiple and/or varied servers and storage elements. For example, the SDS may use internal storage devices connected to the system processor. In embodiments where a single processing element supports all of the security enhancement functionality, a local hard disk drive may serve as the secondary storage of the SDS, and a disk operating system executing on such a single processing element may act as a data server receiving and servicing data requests.

It will be understood by those skilled in the art that the different information used in the security enhancement processes and systems according to the present invention may be logically or physically segregated within a single device serving as secondary storage for the SDS; multiple related data stores accessible through a unified management system, which together serve as the SDS; or multiple independent data stores individually accessible through disparate management systems, which may in some embodiments be collectively viewed as the SDS. The various storage elements that comprise the physical architecture of the SDS may be centrally located, or distributed across a variety of diverse locations.

The architecture of the secondary storage of the system data store may vary significantly in different embodiments. In several embodiments, database(s) are used to store and manipulate the data; in some such embodiments, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), MySQL (MySQL AB, Sweden) or Adaptive Server Enterprise (Sybase Inc., Emeryville, Calif.), may be used in connection with a variety of storage devices/file servers that may include one or more standard magnetic and/or optical disk drives using any appropriate interface including, without limitation, IDE and SCSI. In some embodiments, a tape library such as Exabyte X80 (Exabyte Corporation, Boulder, Col.), a storage attached network (SAN) solution such as available from (EMC, Inc., Hopkinton, Mass.), a network attached storage (NAS) solution such as a NetApp Filer 740 (Network Appliance, Sunnyvale, Calif.), or combinations thereof may be used. In other embodiments, the data store may use database systems with other architectures such as object-oriented, spatial, object-relational or hierarchical or may use other storage implementations such as hash tables or flat files or combinations of such architectures. Such alternative approaches may use data servers other than database management systems such as a hash table look-up server, procedure and/or process and/or a flat file retrieval server, procedure and/or process. Further, the SDS may use as a combination of any of such approaches in organizing its secondary storage architecture.

The hardware device 210 would have an appropriate operating system such as WINDOWS/NT, WINDOWS 2000 or WINDOWS/XP Server (Microsoft, Redmond, Wash.), Solaris (Sun Microsystems, Palo Alto, Calif.), or LINUX (or other UNIX variant). In one preferred embodiment, the hardware device 210 includes a pare-loaded, pre-configured, and hardened UNIX operating system based upon FreeBSD (FreeBSD, Inc., http://www.freebsd.org). In this embodiment, the UNIX kernel has been vastly reduced, eliminating non-essential user accounts, unneeded network services, and any functionality that is not required for security enhancement processing. The operating system code has been significantly modified to eliminate security vulnerabilities.

Depending upon the hardware/operating system platform, appropriate server software may be included to support the desired access for the purpose of configuration, monitoring and/or reporting. Web server functionality may be provided via an Internet Information Server (Microsoft, Redmond, Wash.), an Apache HTTP Server (Apache Software foundation, Forest Hill, Md.), an iPlanet Web Server (iPlanet E-Commerce Solutions—A Sun—Netscape Alliance, Mountain View, Calif.) or other suitable Web server platform. The e-mail services may be supported via an Exchange Server (Microsoft, Redmond, Wash.), sendmail or other suitable e-mail server. Some embodiments may include one or more automated voice response (AVR) systems that are in addition to, or instead of, the aforementioned access servers. Such an AVR system could support a purely voice/telephone driven interface to the environment with hard copy output delivered electronically to suitable hard copy output device (e.g., printer, facsimile, etc.), and forward as necessary through regular mail, courier, inter-office mail, facsimile or other suitable forwarding approach. In one preferred embodiment, an Apache server variant provides an interface for remotely configuring the hardware device 210. Configuration, monitoring, and/or reporting can be provided using some form of remote access device or software. In one preferred embodiment, SNMP is used to configure and/or monitor the device. In one preferred embodiment, any suitable remote client device is used to send and retrieve information and commands to/from the hardware device 210. Such a remote client device can be provided in the form of a Java client or a Windows-based client running on any suitable platform such as a conventional workstation or a handheld wireless device or a proprietary client running on an appropriate platform also including a conventional workstation or handheld wireless device.

Application Layer Electronic Communication Security Enhancement

Figure 3:
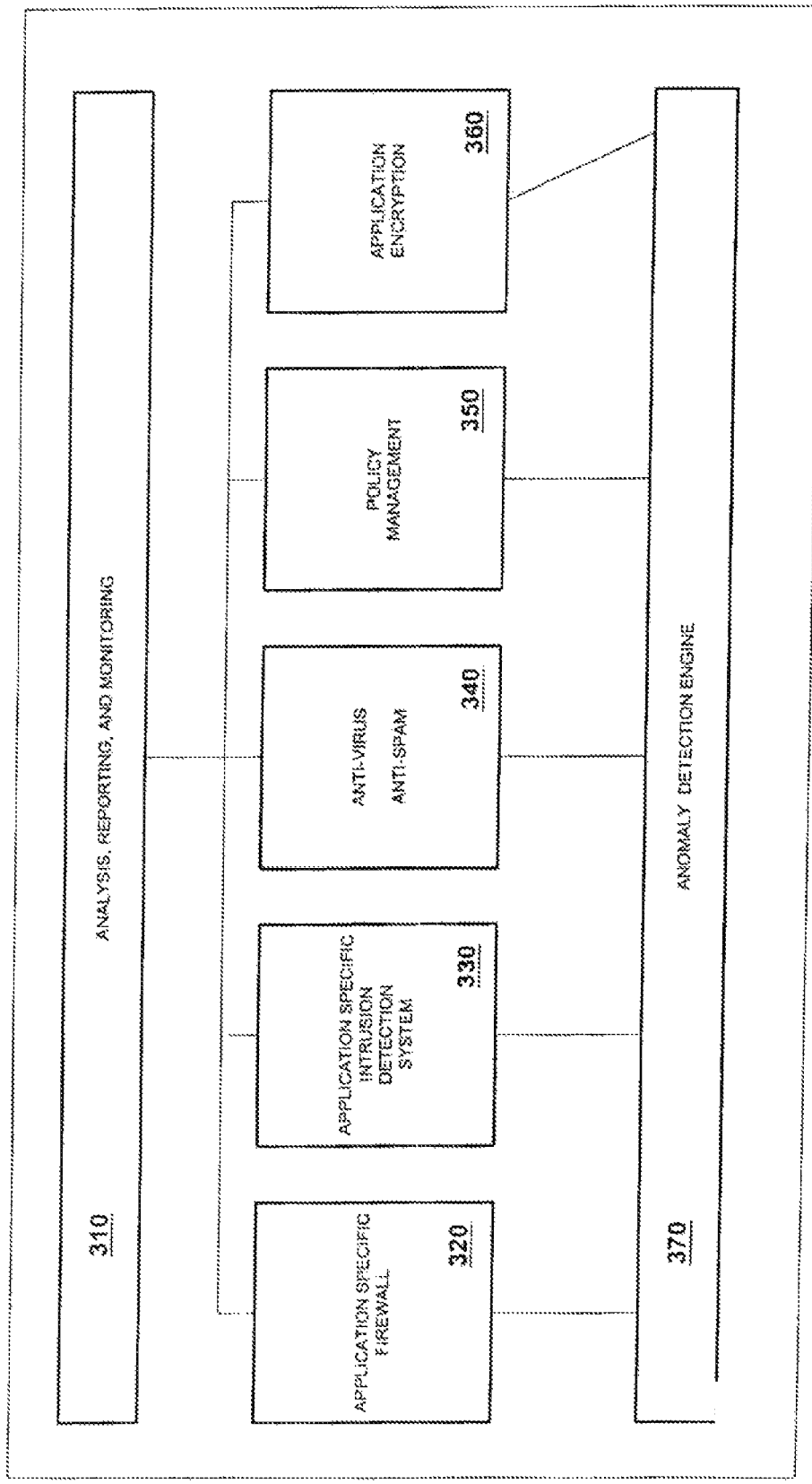
FIG. 3 is a logical block diagram of the components in a typical embodiment of the present invention.

FIG. 3 depicts a block diagram of the logical components of a security enhancement system according to the present invention. The overall analysis, reporting and monitoring functionality is represented by block 310, and anomaly detection is represented by block 370.

Blocks 320-360 represent different assessments that may be applied to electronic communications. These blocks are representative of assessments that may be performed and do not constitute an exhaustive representation of all possible assessments for all possible application server types. The terms "test" and "testing" may be used interchangeably with the terms "assess", "assessment" or "assessing" as appropriate in the description herein and in the claims that follow.

- Application specific firewall 320 provides functionality to protect against application-specific attacks. For instance in the context of e-mail, this assessment could protect against attacks directed towards Extended SMTP, buffer overflow, and denial of service.
- Application specific IDS 330 provides real-time monitoring of activities specific to the application server. This may also retrieve information from multiple layers including the application layer, network layer and operating system layer. This compliments a network instrusion detection system by adding an additional layer of application specific IDS monitoring.
- Application specific anti-virus protection and anti-spam protection 340 provides support for screening application specific communications for associated viruses and/or spam.
- Policy management 350 allows definition of corporate policies with respect to the particular application in regard to how and what application specific communications are sent, copied or blocked. Executable attachments or communication components, often sources of viruses and/or worms, and/or questionable content can be stripped or quarantined before they get to the application server or client. Mail messages from competitors can be blocked or copied. Large messages can be relegated to off-peak hours to avoid network congestion.
- Application encryption 360 provides sending and receiving application communications securely, potentially leveraging hardware acceleration for performance.

The application security system processes incoming communications and appears to network intruders as the actual application servers. This prevents the actual enterprise application server from a direct or indirect attack.

Electronic communications attempting to enter or leave a local communications network can be routed through present invention for assessment. The results of that assessment can determine if that message will be delivered to its intended recipient.

An incoming or outgoing communication, and attachments thereto, are received by a security system according to the present invention. The communication in one preferred embodiment is an e-mail message. In other embodiments, the communication may be an HTTP request or response, a GOPHER request or response, an FTP command or response, telnet or WAIS interactions, or other suitable Internet application communication.

The automated whitelist generation of the present invention allows the system to automatically create and/or maintain one or more whitelists based on the outbound email traffic. In some embodiments, the system can monitor outbound, and/or inbound, email traffic and thereby determine the legitimate email addresses to add to the whitelist. The software can use a set of metrics to decide which outbound addresses are actually legitimate addresses.

A data collection process occurs that applies one or more assessment strategies to the received communication. The multiple queue interrogation approach summarized above and described in detail below provides the data collection functionality in one preferred embodiment. Alternatively, the assessments may be performed on each received message in parallel. A separate processing element of the system processor would be responsible for applying each assessment to the received message. In other embodiments, multiple risk assessments may be performed on the received communication simultaneously using an approach such as a neural network. The application of each assessment, or the assessments in the aggregate, generates one or more risk profiles associated with the received communication. The risk profile or log file generated based upon the assessment of the received communication is stored in the SDS. The collected data may be used to perform threat analysis or forensics. This processing may take place after the communication is already received and forwarded.

In one preferred embodiment, particular assessments may be configurably enabled or disabled by an application administrator. An appropriate configuration interface system may be provided as discussed above in order to facilitate configuration by the application administrator.

An anomaly detection process analyzes the stored risk profile associated with the received communication in order to determine whether it is anomalous in light of data associated with previously received communications. In one preferred embodiment, the anomaly detection process summarized above and described in detail below supports this detection functionality. Anomaly detection in some embodiments may be performed simultaneously with assessment. For instance, an embodiment using a neural network to perform simultaneous assessment of a received communication for multiple risks may further analyze the received communication for anomalies; in such an embodiment, the data associated with the previously received communications may be encoded as weighting factors in the neural network.

In some embodiments, the thresholds for various types of anomalies may be dynamically determined based upon the data associated with previously received communications. Alternatively, an interface may be provided to an application administrator to allow configuration of particular thresholds with respect to individual anomaly types. In some embodiments, thresholds by default may be dynamically derived unless specifically configured by an application administrator.

Anomalies are typically detected based upon a specific time period. Such a time period could be a particular fixed period (e.g., prior month, prior day, prior year, since security device's last reboot, etc.) and apply to all anomaly types. Alternatively, the time period for all anomaly types, or each anomaly type individually, may be configurable by an application administrator through an appropriate interface. Some embodiments may support a fixed period default for all anomaly types, or each anomaly type individually, which may be overridden by application administrator configuration.

In one preferred embodiment, the stored risk profile associated with the received communication is aggregated with data associated with previously received communications of the same type. This newly aggregate data set is then used in analysis of subsequently received communications of that type.

If an anomaly is detected, an anomaly indicator signal is output. The outputted signal may include data identifying the anomaly detected and the communication in which the anomaly was detected. Various types of anomalies are discussed below with respect to e-mail application security. These types of anomalies may be detected using the specific detection approach discussed below or any of the aforementioned alternative anomaly detection approaches.

The outputted signal may trigger a further response in some embodiments; alternatively, the outputted signal may be the response. In one preferred embodiment, the outputted signal may be a notification to one or more designated recipient via one or more respective, specified delivery platform. For instance, the notification could be in the form of an e-mail message, a page, a facsimile, an SNMP (Simple Network Management Protocol) alert, an SMS (Short Message System) message, a WAP (Wireless Application Protocol) alert, OPSEC (Operations Security) warning a voice phone call or other suitable message. Alternatively, such a notification could be triggered by the outputted signal.

Using SNMP allows interfacing with network level security using a manager and agent; an example would be monitoring traffic flow through a particular router. OPSEC is a formalized process and method for protecting critical information. WAP is an open, global specification that empowers mobile users with wireless devices to easily access and interact with information and services instantly. An example would be formatting a WAP page to a wireless device that supports WAP when an anomaly is detected. WAP pages are stripped down versions of HTML and are optimized for wireless networks and devices with small displays. SMS is a wireless technology that utilizes SMTP and SNMP for transports to deliver short text messages to wireless devices such as a Nokia 8260 phone. SMS messages could be sent out to these devices to alert a user of an intrusion detection of anomaly alert.

Instead of or in addition to a notification, one or more corrective measures could be triggered by the outputted signal. Such corrective measures could include refusing acceptance of further communications from the source of the received communication, quarantining the communication, stripping the communication so that it can be safely handled by the application server, and/or throttling excessive numbers of incoming connections per second to levels manageable by internal application servers.

In one preferred embodiment, an interface may be provided that allows an application administrator to selectively configure a desired response and associated this configured response with a particular anomaly type such that when an anomaly of that type is detected the configured response occurs.

Finally, if an anomaly is detected with respect to a received communication, the communication may or may not be forwarded to the intended destination. Whether communications determined to be anomalous are forwarded or not may, in certain embodiments, be configurable with respect to all anomaly types. Alternatively, forwarding of anomalous communications could be configurable with respect to individual anomaly types. In some such embodiments, a default forwarding setting could be available with respect to any individual anomaly types not specifically configured.

Threat Management Center

A TMC system can reside on a computer system in communication with one or more application and/or network layer security systems. A typical hardware configuration for the TMC includes a system processor and a system data store, which can be similar in capacity to those described herein above with respect to the application layer security systems. Typically, the communication can occur via a computer network such as the Internet; however, one or more systems can connect to the TMC via other mechanism including direct connection and dial-up access.

Figure 13:
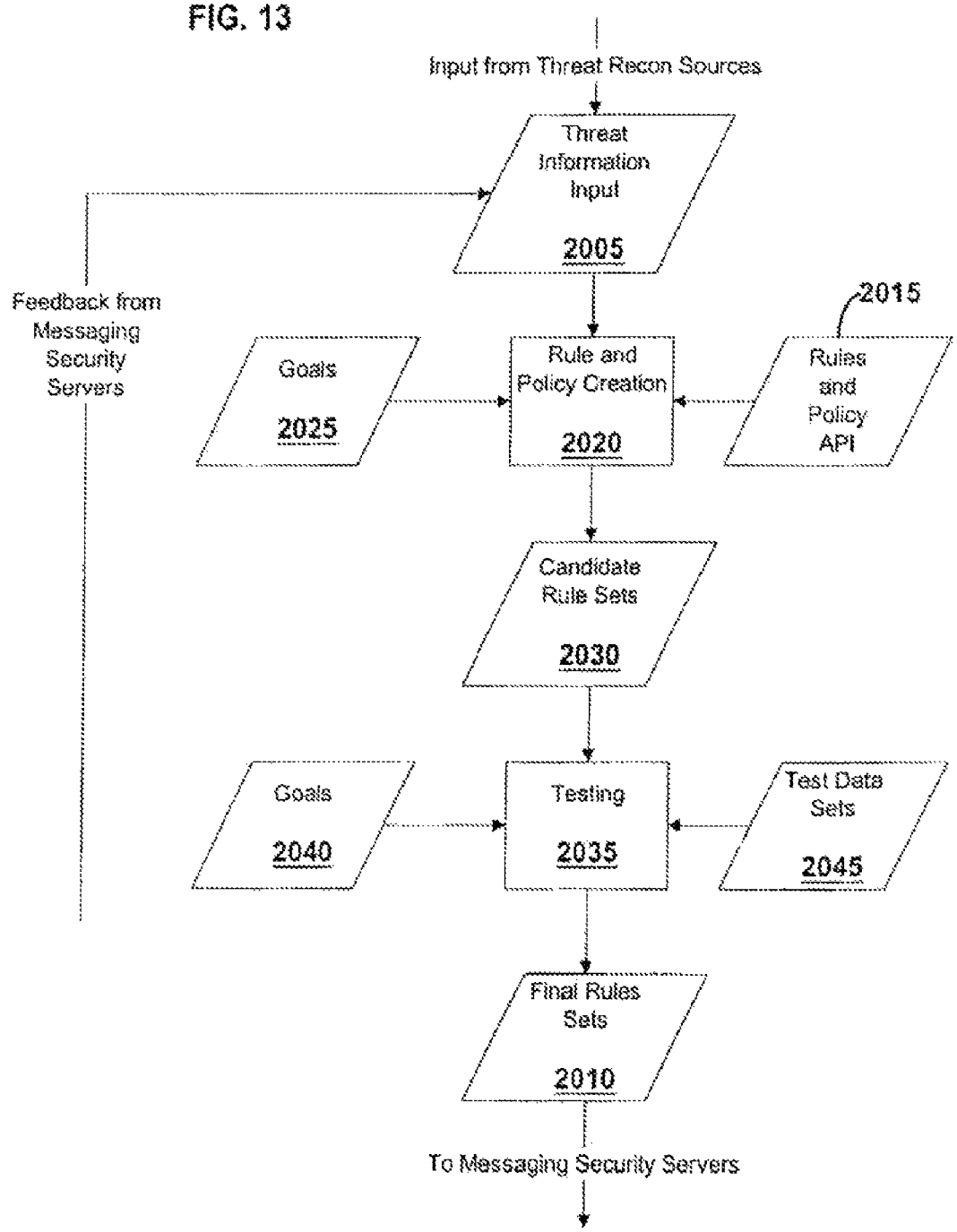
FIG. 13 depicts a block diagram of the Threat Management Center (TMC) using one preferred embodiment according to the present invention.

The TMC includes at least one input, a processing system, and at least one output. FIG. 13 depicts a flow chart of a rule creation process in an exemplary TMC. Input 2005 can be information about messages, messaging systems, attacks, vulnerabilities, threats associated with them, or any other information one skilled in the art would find relevant to threat analysis. In addition, feedback to the TMC may also be provided by one or more application layer security systems. The final output of the TMC 2010 can includes rules and/or policies that can be used to protect against threats, both known and unknown by application layer security systems. These rules and/or policies 2010 can be used by one ore more application layer security systems.

In one preferred embodiment, rule and policy creation can be based the set of threat information that is received. Information can be received from one or more MSSs or any other threat information source configured to communicate with a TMC.

The output 2010 of the TMC can be influenced by a Rules and Policy Application Programming Interface (API) 2015. While only one API is depicted in the exemplary embodiment of FIG. 13, one skilled in the art will realized that multiple APIs can be configured to perform the functions desired. In some embodiments, the API can be modified as often as necessary or desired to account for any changes in threat and/or traffic patterns. The API can be programmed or adapted to use proprietary formats based on message interrogation systems in place on application layer security servers as well as standard intrusion detection rule formats.

In some embodiments, the output of the Rules and Policy API can be in a natural language. In other embodiments the output can be in a rules expression language including but not limited to regular expressions, intrusion detection information format such as IDMEF, mail filtering languages such as SIEVE, propriety rule expression formats or other formats one skilled in the art would find appropriate. As a non-limiting example, natural language output can be used to explain to an administrator or user how to configure the system with the suggested rules and policies.

The API can be used to improve the final set of rules generated by the TMC. As a non-limiting example, some message security systems include interrogation engines that use proprietary rule formats. In such a system, a rule to block incoming messages with a "threat.exe" attachment can be specified as:
Attachment Filtering Rule:
Direction: Incoming
Attachment: threat.exe
Action: Drop message As a non-limiting example, a rule to block incoming messages with a "Threat Title" subject in such a system can be specified as:
Mail Monitoring Rule:
Direction: Both
Field: Subject
Data: Threat Title
Action: Drop message Different embodiments can use different types of rules for performing different types of filtering. If a Rules and Policy API 2015 is used, the Rule and Policy Creation module 2020 must be programmed or adapted to communicate with the API.

The output 2010 of the TMC can be influenced by goals 2025. The goals 2025 can be global goals, goals for individual messaging security servers, or goals for individual users. As non-limiting examples, some MSS embodiments can have more conservative threat management policies. Some embodiments can be configured to use rules that are automatically put in place while other embodiments can be configured to use rules to be approved by a local administrator. In some situations it may be desirable to use rules that discard objectionable content while in other situations it may be desirable to quarantine that content. In other situations, a higher or lower confidence in the likelihood of a threat before an action is taken may be desirable. The goals 2025 can be global goals or different goals for different MSSs. As a non-limiting example, the goal may be a certain effectiveness value and a certain accuracy value. For example, a goal can be given to the system that specifies 95% effectiveness and 99.9% accuracy for spam detection.

In some embodiments, as another goal, the system can allow one or more users, MSS, or other entity to provide a definition of threatening communications. As a non-limiting example, in the case of spam, spam may not be well defined. Rather than allowing only a binary decision, the present invention can classify messages in different categories (e.g. business email, personal email, chain letters, adult language, porn, web product offerings, newsletters, mailing lists, etc.) In some embodiments, an individual user, administrator or other suitable human or computerized user can register preferences concerning receipt of any of these types of content. The system can then enforce that policy for that entity. This can be useful in the threat pushback system further described below and depicted in FIG. 14.

Inputs to Rule and Policy creation 2020 can include, but are not limited to the following:
1. Spam and non-spam messages from archives such as SpamArchive.org, user reported spam, spam identified by the individual messaging security systems, information about misclassified messages, information from databases of known spam such as Distributed Checksum Clearinghouse (http://www.rhyolite.com/anti-spam/dcc) and Razor (http://razor.sourceforge.net)
2. Virus information from virus signatures, or other sources of virus information such as virus alert newsletters, and/or virus alert databases. The system can use this informatiaon to develop virus information before signatures are available. This information can be obtained from anti-virus vendors Sophos and McAfee, for example. This information can be retrieved via HTTP, FTP, SMTP, by direct database access, or other appropriate means. In some embodiments, the system can create rules to block virus outbreaks before virus signatures are available as well as for deployments that do not have other anti-virus systems deployed.
3. Intrusion information: This information can be extracted from vulnerability alerts from sources such as bugtraq, CERT, software vendors, open-source projects, information sharing projects such as the FBI InfraGard, or other sources as appropriate. The information can also be received from distributed intrusion detection systems or it can be manually entered by users.

The system can perform input parsing and feature extraction according to input type and source. In the case of spam messages, the input can include spam messages that are stored in propriety formats such as Microsoft's past format, Unix mbox format, forwarded spam or spam sent as an attachment, an archive of spam messages, or other source. The spam messages can be accessed from local storage or from remote storage using protocols such as, but not limited to, HTTP, SCP, FTP, POP, IMAP, or RPC. For an individual message, relevant features can include headers, origin, and message contents. Each type of feature can be extracted and stored as appropriate.

One preferred embodiment can use regular expression content matching tools to parse messages and extract features. A prefilter can be used that defines the regular expression used for content matching. This determines the type of features that are extracted. As a non-limiting example, for extracting message subjects, a regex filter can be used that only examines subject lines. To extract information about all headers, a regex filter can be used that only observes message headers. Similarly different pre-filters can be used to extract different types of content from the body. A normal tokenizer pre-filter can provide normal content features. These features can be words, phrases, n-grams, or other features one skilled in the art would find useful. The prefilter can be sensitive to certain types of words including ignoring certain email address and domain names. The prefilter can also cause the features to focus on email addresses, URLs, phone numbers, etc.

The system can include an anonymization module that assures that sensitive features are not extracted and exposed. As a non-limiting example, the anonymization module can determine the identification of the spam victim and the domain and prevent exposure of that information.

For virus alerts, input can be email messages that explain the presence and properties of a new virus or worm. The input parser an be configured to parse these messages and determine the relevant properties of a threat. These properties can include, but are not limited to, the attachment name or types, subject lines, and from addresses. The input parser may be given different format definition files or re-filters for the different sources of virus alerts. Alternatively, the virus alert parser can be in communication with web pages to access other information. The information can be parsed for relevant properties. In other embodiments, the virus alert parser may interact directly with a database that stores such information or a user may manually enter data based on such information into the system.

The rule creation system 2020 can reside on a single system or multiple processes can run on multiple systems. Threat information can be reduced to a canonical form and the relevant features extracted. The system can utilize a diversity of algorithms to determine the relevant features and/or reduce the feature set. In some embodiments, each located feature can be associated with an interrogation system on the MSS.

The TMC cans determine the appropriate type of rule to create. In some embodiments, a feature can be expressed using a plurality of interrogation systems. In some embodiments, feature sets can be reduced and efficient types of rules can be created.

In some embodiments, resultant rules can have a given weight and certain interrogation systems may have some weight in the overall threat value for a particular message. These values can be determined based on the input from the system. Therefore, these values can be adjusted when desired based on new threats, feedback from the MSSs, and other appropriate sources. The MSSs can be programmed or adapted to determine an aggregate threat likelihood based on automatically adjusted weights, or confidence values for each rule and interrogation system, or other relevant information. In one preferred embodiment, the rule creation system 2020 can include a scheduler that looks for new threat information.

The system first creates a set of candidate rule sets 3030. Before these are distributed the system can use goal-based testing 2035 to determine the validity of these rules.

Some embodiments of the present invention can test the rules and policies. The test data 2045 may include threatening and non-threatening data. The system can use the test data sets to discover false positives and negatives of the system as well as general system performance. The goals 2040 used for rule creation can also be used as input to the testing. Additional goals, including but not limited to, performance goals can be specified for testing. If specified goals are not met the system can automatically adjust the feature sets, the weights of individual features, the weights of each interrogation system, and any other relevant parameters to reach the goals. Once the correct tuning is achieved, the rule sets can be approved and distributed the MSSs.

Threat Pushback System

Many systems known in the art only address symptoms of an attack in the local environment. Besides notifying other systems that participate in the network of MSSs, some embodiments of the present invention can determine the source of a threat and push the threat back towards the source. Once the source of a threat is determined, the system can send messages up the network to other systems in the hierarchy.

A threat pushback system can reside on a computer system as part of, or as a compliment to, an application client, an application layer security system or a TMC. A typical hardware configuration for the threat pushback system includes a system processor and a system data store, which can be similar tin capacity to those described herein above with respect to the application layer security systems. Typically, the communication can occur via a computer network such as the Internet; however, one or more other mechanism can be used including direct connection and dial-up access.

Figure 14:
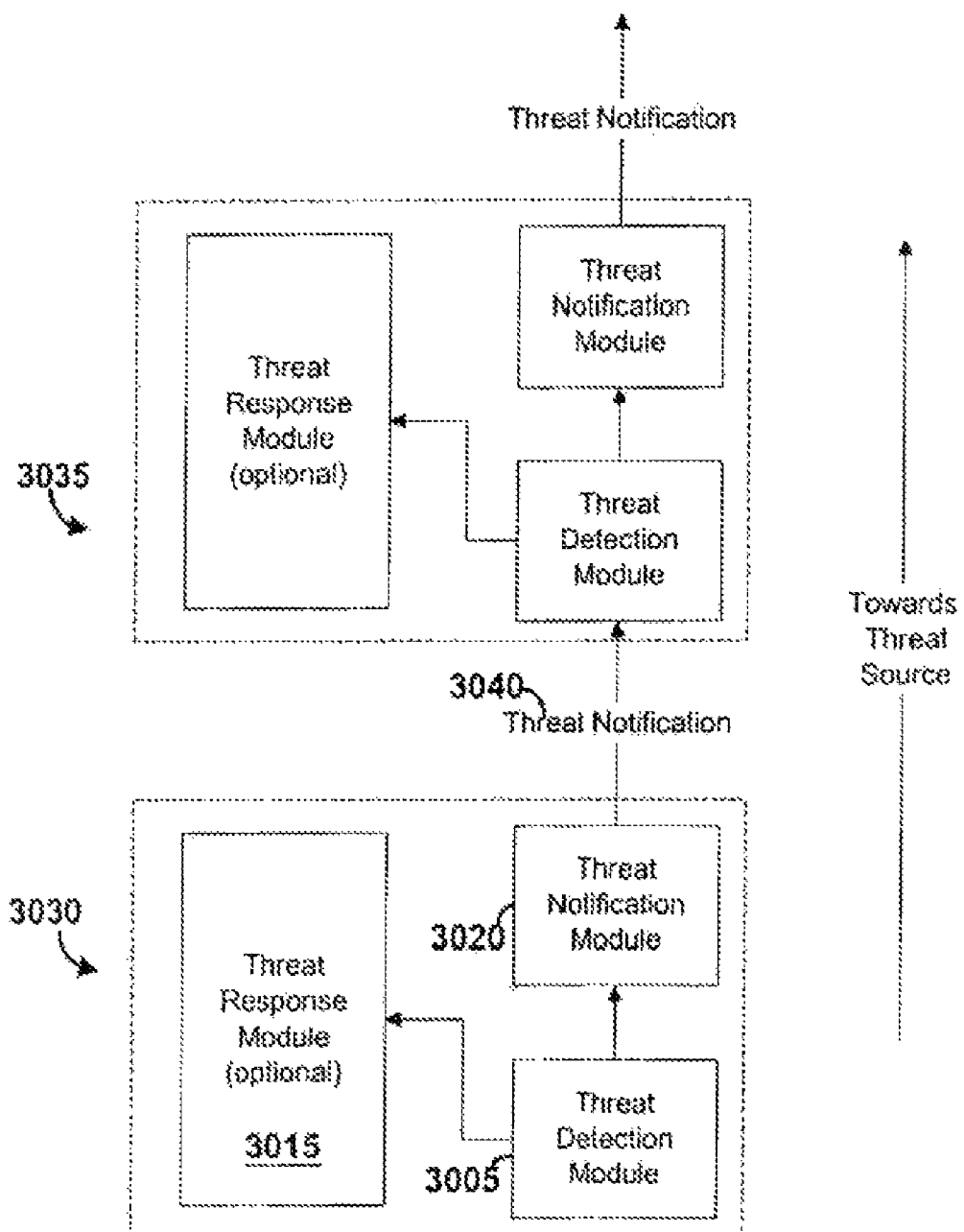
FIG. 14 depicts an exemplary Threat PushbackSystem using one preferred embodiment according to the present invention.

FIG. 14 depicts an exemplary threat pushback system. Two threat aware modules 3030, 3035 are depicted. Once a threat is detected locally 3005, the threat informatiaon can be passed as a Threat Notification Module (TNM) 3020. The TNM can pass a threat notification 3040 including information about the threat to the Threat Detection Module of another system 3025. In a preferred embodiment, the TNM of a MSS can pass information to another MSS. In still another embodiment, any TMN at any location in the network such as within, or connected to, client applications/systems, application layer security systems and/or threat management centers can pass information to its parent in the network hierarchy.

The threat notification protocol can be standardized across the participating systems. Some embodiments can include a threat response module 3015 programmed or adapted to respond to the threat notification information.

In a preferred embodiment, the system of the present invention can be programmed or adapted to function at the application-layer. Such an embodiment can be readily deployable. If an underlying network-layer pushback system is operational, the system can utilize some of its functionality to determine the path to a threat. Additionally, the threat notification system can determine the source of the attack. As a non-limiting example, in the cases of spam, to determine the source of the attack, message headers must be examined. The system can determine how many of these headers can be trusted. Forged headers can be identified and ignored. This process may include lookups to external databases such as registries of IP and ASN numbers such as ARIN or databases of spam sources such as spamhaus.

Because an attacker may be able to forge the path information that is shown in the communication, the system can process the available information to determine the correct path. This can be accomplished with any combination of application level information, network information, or information from external systems such as IP traceback systems, and other resources known to one skilled in the art. At the application level, an attacker may be able to forge some identifying information. The path determination module can provide the path information to the notification sender module. The path determination module can include a path extraction submodule and a path verification submodule.

In one embodiment, the path extraction submodule can parse the identifying information and provide that as the path information. That information, however, has not verified and could be inaccurate. In another preferred embodiment, the path verification module can process the extracted path information to determine the valid path information. As a non-limiting example, the path extraction submodule can read message information such as the headers. The Return-Path or Received headers can provide information regarding the path of email servers that a message traveled. The "FROM" header can be used to identify the email address of the sender. The "MAIL FROM" RFC 821 header an be used to indicate the email address of the sender. The "EHLO" RFC 821 header can be used to indicate the domain or hostname of the sender. Other headers and message features may be used including the Message-Id and the actual contents of the message. Call for action information is contact information provided for the received such as a reply email address, a URL, a postal address, or a phone number. This information in a message can be used. Other information known to one skilled in the art, including but not limited to the IP address of the network connection, can also be used.

Several verification methods can be used to determine information authenticity. As a non-limiting example, most of the above-mentioned headers are easily forged, so a more reliable source is the Return-Path or Received headers. The goal of the present invention is to determine the longest possible authentic path. In one embodiment of the present invention, only the last header is used since this header represents the actual server that contacted the victim's server. Each Received header contains Received from and Received by information. These fields can be verified with DNS for appropriate MX records, A records, and/or reverse records, as well as other appropriate sources known to one skilled in the art. These hosts can be checked against open relay lists, dial-up addresses lists and known spam sources lists. The presence on any of these lists can provide additional information about the last accurate Received header. Additionally, the chain of received headers can be verified against each other. Inconsistencies in this chain can also give additional information about the last accurate Received header. Other details of these headers can be used to verify the path. As a non-limiting example, the date information and server version information can be used.

Once the system determines that a pushback message needs to be forwarded in a particular direction, the system can determine what information needs to be included in the pushback message. The threat notification of the present invention includes additional detailed information about the threat in addition to the IP address of the source.

Detailed threat information can allow systems to make local decisions about how to react to a threat. As a non-limiting example, the above described threat classification system can be used to process spam messages. Information concerning a spam attack sent through the threat pushback system can include information concerning the category of threat and other relevant characteristics.

The receiving system can be configures to block certain portions of communications at an organizational level. Furthermore, ISPs could use this information to block certain categories of spam messages including, but not limited to, fraudulent messages. The system can be configured such that an organization can have policies to block chain letters and adult language. At the desktop level, an individual can configure the system to block newsletters and mailing lists in addition. This allows a common definition for blocked material as close to the source as possible while not requiring a common definition of spam.

The threat information can indicate, among other parameters, the presence of a threat, as well as identify the source, and/or provide detailed threat and/or response information. To identify the source, the information provided can include the identity path information. Additionally, path information can be provided so that other hosts can perform independent own extraction and/or verification. The system of the present invention can also indicate the traffic that is determined to be a threat so that the receivers on the path can determine the details from stored information. This systems and methods of the present invention are an enhanced form of reverse path forwarding used in routing systems.

Whitelisting

In one embodiment the system can be configured so that communications matched to a whitelist entry may be subject to either no interrogation or less rigorous interrogation. Once a whitelist has at least one entry, the incoming message interrogation system can utilize it in connection with the interrogation of a message.

FIG. 10 depicts operations that can be performed on a whitelist to add an entry. Once an outgoing address passes any exclusion conditions 1005 described above, it can be added to a whitelist. The whitelist can be stored on SDS. The system first checks to see if the address is already present on the list 1010. If present, the list can be updated with any new information 1015. Before new information is updated, the system can check for sufficient space in the SDS 1025. If sufficient space is not available, additional space is allocated from the SDS 1030. If an address is not found in a whitelist, an initial record can be added for that address. Before a new address is added to a whitelist 1040, the system can check for sufficient space in the SDS 1020. If sufficient space is not available, additional space is allocated from the SDS 1035. In many embodiments, explicit space allocation need not occur rather implicit space allocation occurs as a result of an information update 1015 or an add entry 1040.

The initial record for an outbound address can include the email address, the internal email address, the message sent time, usage count, last time used and/or any other characteristics one skilled in the art would find relevant or useful. In the case of an email address that is already present on a whitelist, the system can use a separate record for each instance of that email address being used as an outbound address or the system can maintain a single record for each outbound address with a summary of information in that entry, including information describing instances of use. The system can store records in a number of other ways using different data structures. The records may include other representations of data in addition to the email address, including by not limited to a hash of the email address.

In a preferred embodiment, the system can store records in a MySQL database. As a non-limiting example, the following command can be used to build a database comprising the external and internal email addresses, date of last update, and an occurrence counter.

create table ct whitelist

| (out_emailaddress | varchar(255) not null, | - External email address |
|---|---|---|
| in_emailaddress | varchar(255) not null, | - Internal email address |
| lastupdatetime | datetime, | - Last update of this address |
| curr_count | integer, | - Address occurrence counter |
| ); | | |

Maintaining the Whitelist

In some embodiments, the system can allow unlimited storage. In other embodiments, the storage available for the list can be limited. In still other embodiments, the system can allow for management of the size of the list. A number of caching techniques can be used, including but not limited to first in first out and least recently used. Other techniques can include an accounting of the number of internal users that reported outbound address. List cleanup can occur in real-time or periodically. Additionally, one skilled in the art will recognize that a wide variety of list management techniques and procedures can be used to manage a whitelist in connection with the present invention.

Whitelist Usage

An example of a system using a whitelist according to the present invention is shown in FIG. 9. One or more relevant parameters of inbound communication 905 are compared against one or more whitelists 910. In some embodiments, the whitelist is checked at each incoming email message. In a preferred embodiment, the comparison includes origination email addresses. If the check against a whitelist 910 reveals no match, then the message is subject to normal messages interrogation 915. Normal message interrogation can employ analysis criteria that are the most sensitive to spam or other threats as discussed hereinabove. If a message passes normal interrogation 915, i.e. it is determined not to be spam or a threat (or to have a lower likelihood of being spam or a threat), it can be presented to its intended recipient for delivery 920. If the check against a whitelist 910 reveals a match, the system can be configured to process the message in a variety of ways. In one embodiment, the system can be programmed or arranged to bypass 925 any message interrogation and deliver the message to its intended recipient 920. In an alternative embodiment, the system can be programmed or arranged to process the message using adaptive message interrogation 930. If adaptive message interrogation 930 determines a message is not spam, it can forward the message for delivery 920.

In some embodiments, both options 925, 930 are selectively available. The decision whether to pass whitelisted communications through adaptive message interrogation 930 or to bypass any message interrogation 925 can be made per deployment or can be based on the details of the whitelist entry. For instance, messages from more frequently used outbound address can bypass 925 interrogation completely whereas messages from less frequently used outbound addresses can be subjected to adaptive message interrogation 930.

If the message goes through normal or adaptive interrogation with the whitelist information, the interrogation module can utilize the whitelist information to effect the type and/or level of interrogation. In some preferred embodiments, the adaptive message interrogation can use multiple levels of trust, as further described below and in FIG. 11. In other embodiments, the adaptive message interrogation can set a confidence indicator indicative of the confidence the interrogator has in its characterization.

Messages that are not delivered to the intended recipient can be either quarantined or deleted. In an alternative embodiment, messages determined to be spam can be indicated as spam or a threat and forwarded to the intended recipient.

Additionally, each outbound email address can be assigned a confidence value. According to the confidence value associated with a given incoming email address, incoming messages can be subjected to variable levels of interrogation. In one preferred embodiment, incoming messages associated with lower confidence values are subjected to more aggressive spam interrogation and incoming messages associated with higher confidence values are subjected to less aggressive spam interrogation. In other embodiments, the message can be given positive credits to offset any negative spam detection points based on the confidence value.

One preferred embodiment of the system allows some or all external email recipients to be whitelisted 935. Some embodiments can have a metric that describes the number of outgoing messages to a particular email address. When the metric reaches a certain threshold, the email address can be whitelisted. Other embodiments can include the ability to track addresses over time. In those embodiments, if the metric exceeds a certain value for a particular outbound email address during a particular time, then that entry can be whitelisted.

The parameters described above may be configurable by an application administrator through an appropriate interface. Some embodiments may support fixed parameters which may be overridden by application administrator configuration.

In some embodiments, the threshold for characterization as spam or a threat may be dynamically determined based upon the data associated with previously received communications. Alternatively, an interface may be provided to an application administrator to allow configuration of particular thresholds with respect to individual addresses. In some embodiments, thresholds by default may be dynamically derived unless specifically configured by an application administrator.

When spam or a threat is detected, instead of, or in addition to, a notification, one or more response measures could be triggered. Such responsive measures could include refusing acceptance of further communications from the source of the received communication, quarantining the communication, stripping the communication so that it can be forwarded to its intended recipient, and/or throttling excessive numbers of incoming communications from certain sources.

Authenticated Whitelist

One issue with whitelists is that attackers or spammers can pretend to send messages from whitelisted addresses and therefore bypass filtering and anti-spam tools. It is relatively easy for an attacker to forge the send information on messages. To overcome this limitation of whitelists, the system of the present invention allows the authentication of the sender information. There are several methods for integrating sender authentication with a whitelist system. In one embodiment, only authenticated senders can be whitelisted. Such a procedure can reduce the likelihood of forged senders being whitelisted. However, in many environments, the percentage of messages that are authenticated is low, thereby reducing the effectiveness of whitelisting. Some embodiments of the present invention can allow both authenticated and unauthenticated senders to be whitelisted. In these embodiments, a higher trust value is given to messages from authenticated senders. SMIME and PGP offer mechanism for providing authentication.

Figure 11:
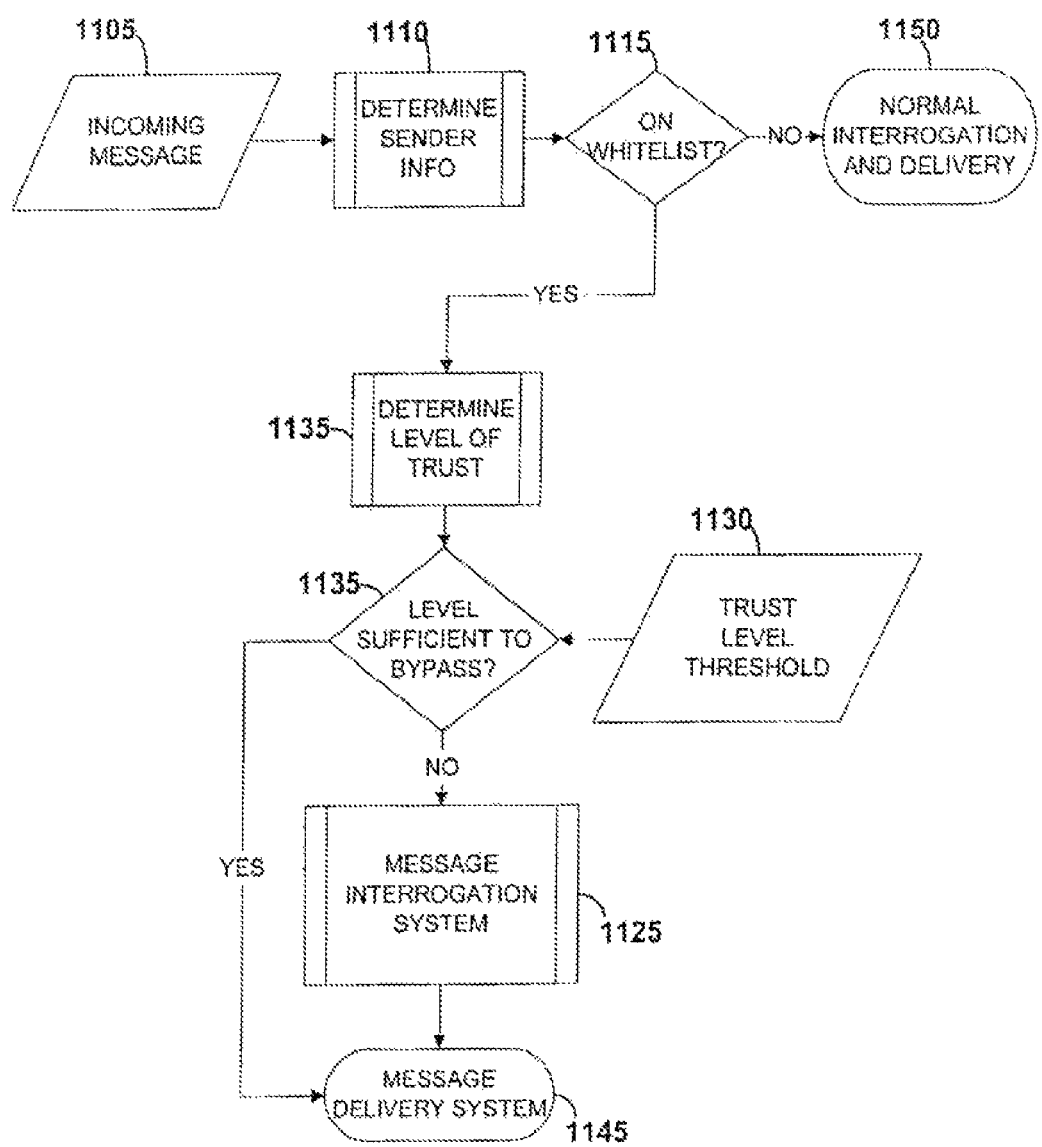
FIG. 11 is a flow charge of an exemplary interrogation process according to the present invention.

One such embodiment is depicted in FIG. 11. As a non-limiting example, when a message 1105 is received from a sender on a whitelist 1115 an associated level of trust is retrieved or calculated 1135. In some embodiments, the trust level value is a single value associated with the whitelist entry that simply requires retrieval. In other embodiments, the trust level value can be calculated as a weighted sum of various characteristics of the entry; in some such embodiments, the weights can be statically defined, defaulted subject to override by a user or other computer system or dynamically configurable. That associated level of trust can be compared to a threshold level 1140. Any communications that have a trust level that meets or exceeds the trust level threshold can bypass message interrogation 1120 while communications that do not have a trust sufficient trust level will be processed with at least some interrogation. 1125. Messages that bypass interrogation 1120 as well as messages that pass interrogation 1125 can be delivered to the intended recipient 1145. In such an embodiment, messages not associated with a whitelist entry are subjected to interrogation and further processing 1150.

Some embodiments of the present invention can allow the trust level threshold 1130 to be configured by an administrator, other user of the system or other computer systems.

Exclusions from Whitelist

The spam/threat detection according to present invention examines every outbound message and maintains a list of known outbound email addresses. The resulting list can then be used as the list of trusted senders. However, it may not be advisable in all cases to add every outbound message recipient to the list of trusted senders for incoming mail. For example, while a user may send a message to a newsgroup, that does not indicate that messages from this newsgroup should necessarily bypass mail filtering. To further illustrate, a user may send an unsubscribe message to a newsletter or in response to a spam message. Thus, there can be situations in which unconditional whitelist addition is not advisable. The system of the present invention allows certain exclusion conditions to be entered and applied.

These exclusion conditions can include rule sets, heuristics, artificial intelligence, decision trees, or any combination thereof. The conditions can be set by and administrator or other user of the system.

Multiple Queue Approach to Interrogation of Electronic Communications

Figure 7:
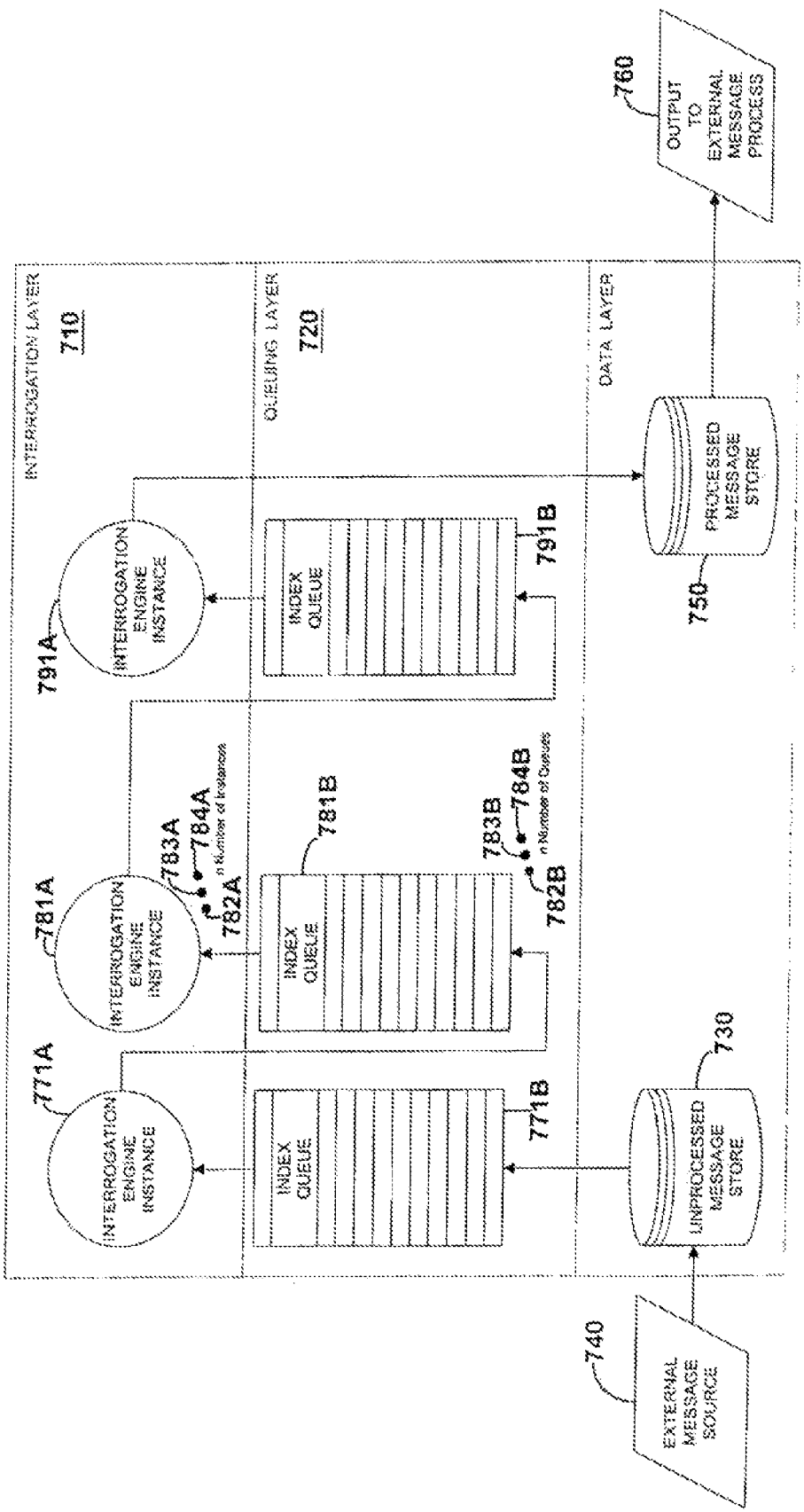
FIG. 7 is a block diagram depicting the architecture of an exemplary embodiment of a risk assessment approach according to the present invention using multiple queues to manage the application of a plurality or risk assessments to a received communication.

With reference to FIG. 7, a multiple queue approach is provided for applying a plurality of risk assessments to a received communication.

Messages are first placed in an unprocessed message store 730, a portion of the SDS, for advanced processing and administration. Messages come in from an external source 740 and are placed in this store 730. This store 730 maintains physical control over the message until the end of the process or if a message does not pass interrogation criteria and is, therefore, quarantined.

An index to the message in the store 730 is used to pass through each of the queues 771B, 781B-784B, 791B in the queuing layer 720 and to the interrogation engines 721A, 781A-784A, 791A instead of the actual message itself to provide scalability and performance enhancements as the index is significantly smaller than the message itself.

Both the queues and the interrogation engines use the index point back to the actual messages in the unprocessed message store 730 to perform actions on the message. Any suitable index allocation approach may be used to assign an index to a received message or communication. For instances, indices may be assigned by incrementing the index assigned to the previously received communication beginning with some fixed index such as 0 for the first received communication; the index could be reset to the fixed starting point after a sufficiently large index has been assigned. In some embodiments, an index may be assigned based upon characteristics of the received communication such as type of communication, time of arrival, etc.

This approach provides independent processing of messages by utilizing a multi-threaded, multi-process methodology, thereby providing a scalable mechanism to process high volumes of messages by utilizing a multi-threaded, multi-process approach.

By processing messages independently, the queuing layer 720 decides the most efficient means of processing by either placing an index to the message on an existing queue or creating a new queue and placing the index to the message on that queue. In the event that a new queue is created, a new instance of the particular interrogation engine type will be created that will be acting on the new queue.

Queues can be added or dropped dynamically for scalability and administration. The application administrator can, in one preferred embodiment, configure the original number of queues to be used by the system at start-up. The administrator also has the capability of dynamically dropping or adding specific queues or types of queues for performance and administration purposes. Each queue is tied to a particular interrogation engine where multiple queues and multiple processes can exist.

Proprietary application-specific engines can act on each queue for performing content filtering, rules-based policy enforcement, and misuse prevention, etc. A loosely coupled system allows for proprietary application-specific applications to be added enhancing functionality.

This design provides the adaptive method for message interrogation. Application-specific engines act on the message via the index to the message in the unprocessed message store for completing content interrogation.

Administration of the queues provides for retrieving message details via an appropriate interface such as a Web, e-mail and/or telephone based interface system as discussed above in order to facilitate access and management by the application administrator. Administration of the queues allows the administrator to select message queue order (other than the system default) to customize the behavior of the system to best meet the needs of the administrator's particular network and system configuration.

Figure 8A:
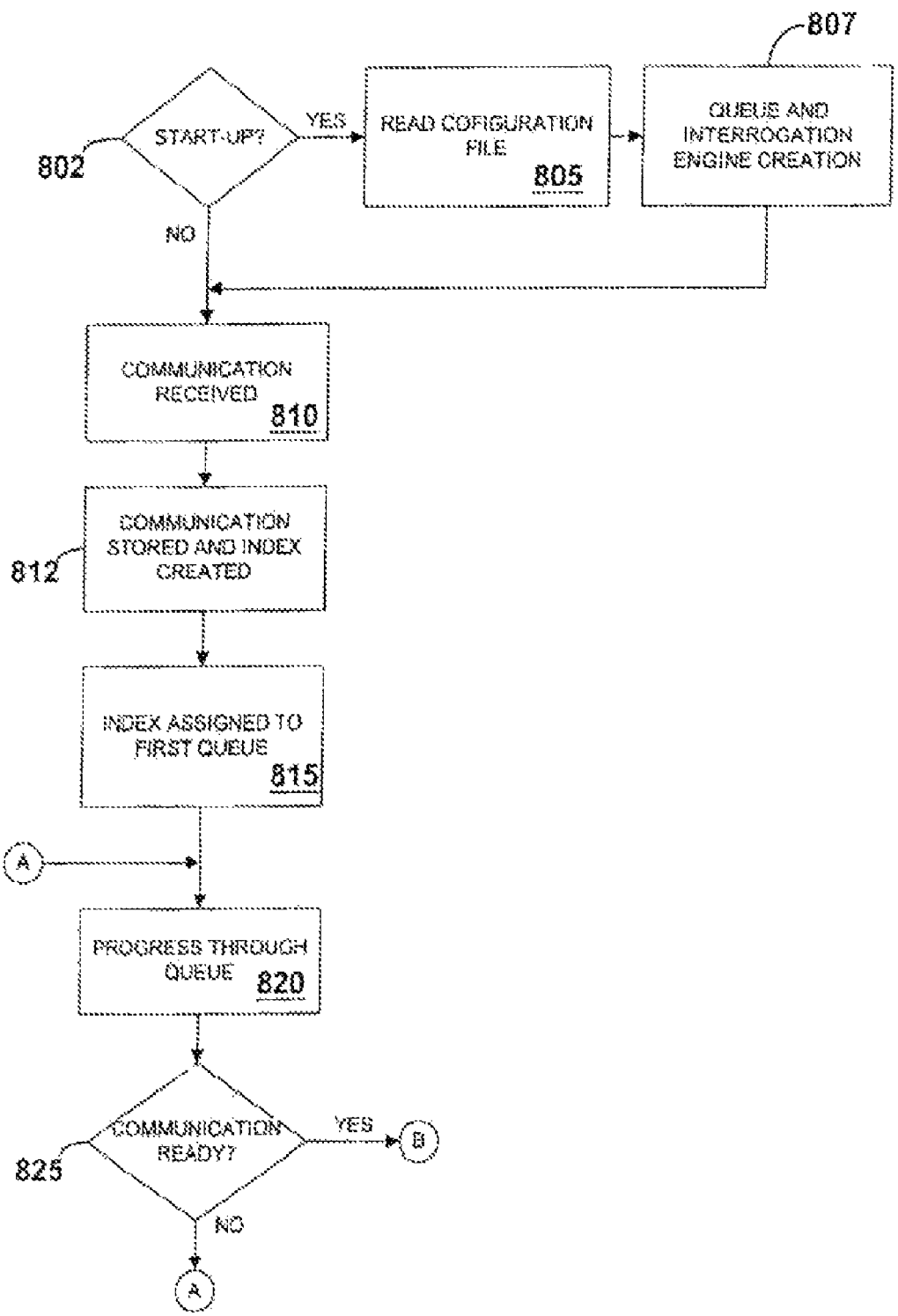
FIGS. 8A-8B are flow chart depicting the process of accessing risk associated with a received communication using the architecture depicted in FIG. 7.
Figure 8B:
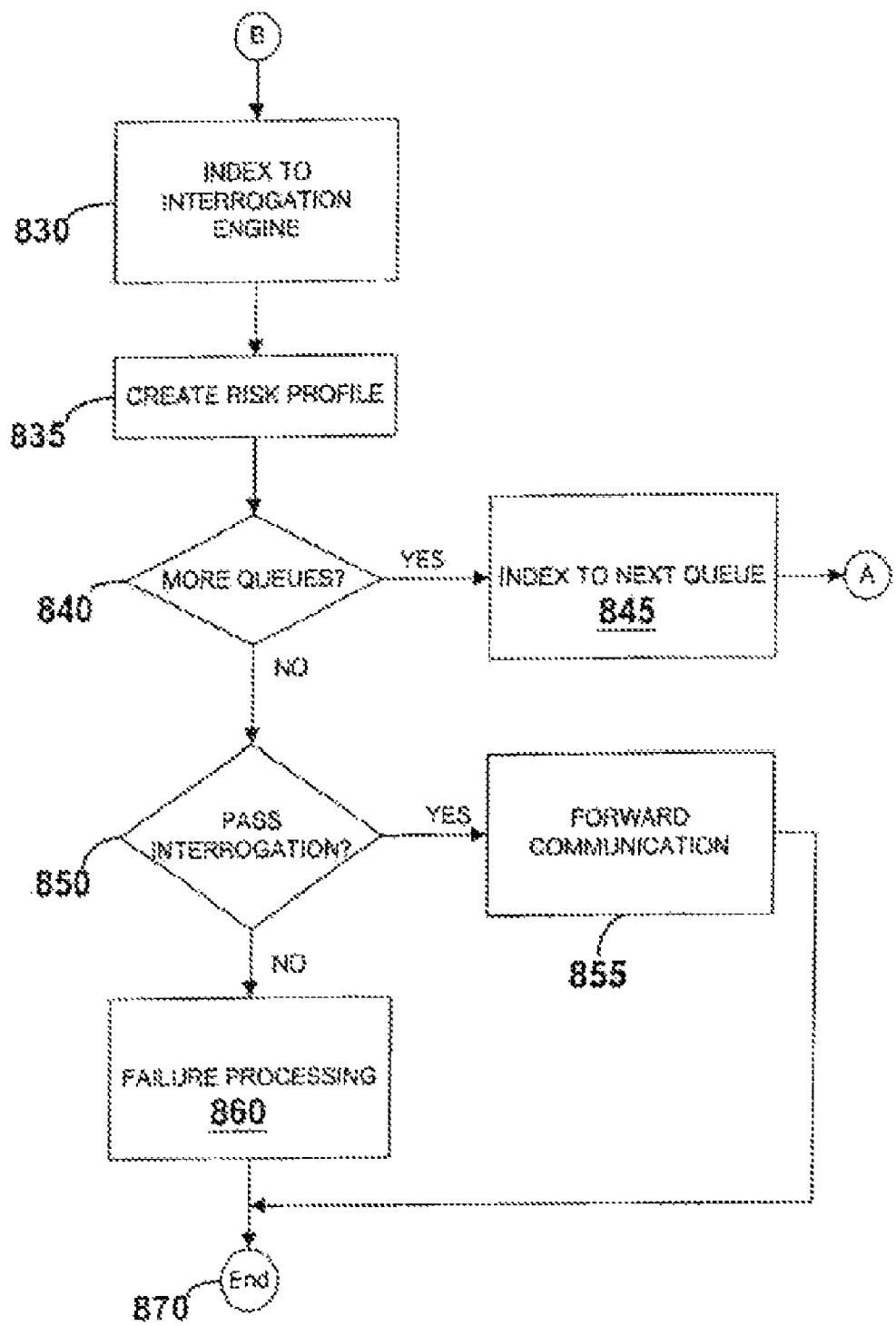

FIGS. 8A-8B are flow charts depicting use of the multiple queue approach to assess risk associated with a received communication. At step 802 a determination is made if the start-up of the process is being initiated; if so, steps 805 and 807 are performed to read appropriate configuration files from the SDS to determine the type, number and ordering of interrogation engines and the appropriate queues and instances are created. If not, the process waits at step 810 for a receipt of a communication.

Upon receipt at step 812, the communication is stored in a portion of the SDS referred to as the unprocessed message store. The communication is assigned at stop 815 an index used to uniquely identify it in the unprocessed message store, and this index is placed in the first queue based upon the ordering constraints.

The processing that occurs at step 810 awaiting receipt of communication continues independently of the further steps in this process, and will consequently spawn a new traversal of the remainder of the flow chart with each received communication. In some embodiments, multiple instances of step 810 may be simultaneously awaiting receipt of communications.

In some embodiments, the receipt of a communication may trigger a load evaluation to determine if additional interrogation engines and associated queues should be initiated. In other embodiments, a separate process may perform this load analysis on a periodic basis and/or at the direction of an application administrator.

The index moves through the queue 820 until it is ready to be interrogated by the interrogation engine associated with the queue as determined in step 825. This incremental movement is depicted as looping between steps 820 and 825 until ready for interrogation. If the communication is not ready for evaluation at step 825, the communication continues moves to move through the queue at step 820. If the communication is ready, the index is provided to the appropriate interrogation engine at step 830 in FIG. 8B.

The interrogation engine processes the communication based upon its index in step 830. Upon completion of interrogation in step 835, the interrogation creates a new risk profile associated with the received communication based upon the interrogation.

If additional interrogations are to occur (step 840), the index for the communication is place in a queue for an instance of the next interrogation type in step 845. Processing continues with step 820 as the index moves through this next queue.

If no more interrogations are required (step 840), a further check is made to determine if the communication passed interrogation by all appropriate engines at step 850. If the communication passed all interrogations, then it is forwarded to its destination in step 855 and processing with respect to this communication ends at step 870.

If the communication failed one or more interrogation as determined at step 850, failure processing occurs at step 860. Upon completion of appropriate failure processing, processing with respect to this communication ends at step 870.

Failure processing may involve a variety of notification and/or corrective measures. Such notifications and/or corrective measures may include those as discussed above and in further detail below with respect to anomaly detection.

Anomaly Detection Process

Figure 6:
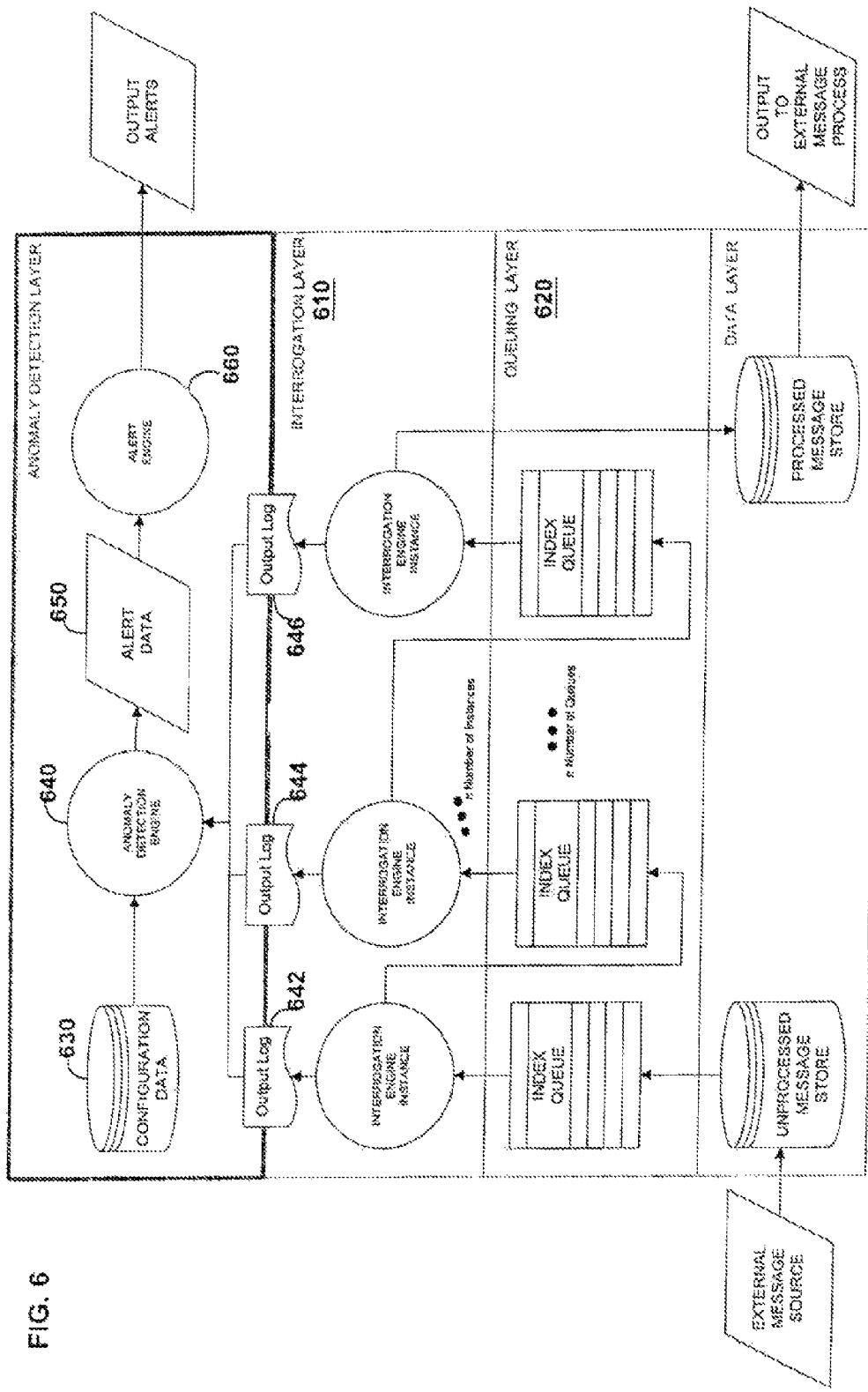
FIG. 6 is a bock diagram depicting the architecture of an exemplary embodiment of a security enhancement system according to the present invention.

The Anomaly Detection process according to an exemplary embodiment of the present invention uses three components as depicted in FIG. 6:

1. Collection Engine

This is where the actual collection of data occurs. The collection engine receives a communication directed to or originating from an application server. One or more tests are applied to the received communication. These one or more tests may correspond to the various risk assessments discussed above.

The collection engine in one preferred embodiment as depicted in FIG. 6 uses the multiple queue approach discussed above, however, this particular collection engine architecture is intended as exemplary rather than restrictive with respect to collection engines usable within the context of this anomaly detection process.

As depicted in FIG. 6, the collection engine includes one or more interrogation engines of one of more interrogation engine types in an interrogation layer 610. Associated with each interrogation engine type in a queuing layer 620 is at least one indices queue containing the indices of received communication awaiting interrogation by an interrogation engine of the associated type. Collectively, the queuing layer 620 and the interrogation layer 610 form the collection engine. A received communication is received, stored in the SDS and assigned an index. The index is queued in the queuing layer for processing through the collection engine.

2. Analysis Engine

The data collected by the previous component us analyzed for unusual activity by the anomaly detection engine 640. The analysis is based on data accumulated from analysis of previously received communications over a period of time. A set of predefined heuristics may be used to detect anomalies using dynamically derived or predetermined thresholds. A variety of anomaly types may be defined generally for all types of Internet application communications while others may be defined for only particular application types such as e-mail or Web. The data associated with previously received communications and appropriate configuration data 630 are stored in the SDS.

The set of anomaly types that the analysis engine will detect may be selected from a larger set of known anomaly types. The set of interest may be set at compile time or configurable at run time, or during execution in certain embodiments. In embodiments using the set approach all anomaly types and configuration information are set within the analysis engine. In some such embodiments, different sets of anomalies may be of interest depending upon the type of communication received. In configurable at run time embodiments, anomaly types are read from a configuration file or interactively configured at run time of the analysis engine. As with the set approach, certain anomaly types may be of interest with respect to only selected types of communication. Finally, in some embodiments (including some set or configurable ones), an interface such as described above may be provided allowing reconfiguration of the anomaly types of interest and parameters associated therewith while the analysis engine is executing.

The thresholds for various types of anomalies may be dynamically determined based upon the data associated with previously received communications. Alternatively, an interface may be provided to an application administrator to allow configuration of particular thresholds with respect to individual anomaly types. In some embodiments, thresholds by default may be dynamically derived unless specifically configured by an application administrator.

Anomalies are typically detected based upon a specific time period. Such a time period could be a particular fixed period (e.g., prior month, prior day, prior year, since security device's last reboot, etc.) and apply to all anomaly types. Alternatively, the time period for all anomaly types, or each anomaly type individually, may be configurable by an application administrator through an appropriate interface such as those discussed above. Some embodiments may support a fixed period default for all anomaly types, or each anomaly type individually, which may be overridden by application administrator configuration.

In one preferred embodiment, as depicted in FIG. 6, information from the risk profiles 642, 644, 646 generated by the collection engine is compared with the acquired thresholds for anomaly types of interest. Based upon these comparisons, a determination is made as to whether the received communication is anomalous, and if so, in what way (anomaly type) the communication is anomalous.

In one preferred embodiment, the stored risk profile associated with the received communication is aggregated with data associated with previously received communications of the same type. This newly aggregate data set is then used in analysis of subsequently received communications of that type.

If an anomaly is detected, an anomaly indicator signal is output. The outputted signal may include data identifying the anomaly type detected and the communication in which the anomaly was detected such as alert data 650. Various types of anomalies are discussed below with respect to e-mail application security. These types of anomalies may be detected using the specific detection approach discussed below or any of the aforementioned alternative anomaly detection approaches.

3. Action Engine

Based on the analysis, this component takes a decision of what sort of action needs to be triggered. Generally the action involves alerting the administrator of the ongoing unusual activity. An alert engine 660 performs this task by providing any appropriate notifications and/or initiating any appropriate corrective actions.

The outputted signal may trigger a further response in some embodiments; alternatively, the outputted signal may be the response. In one preferred embodiment, the outputted signal may be a notification to one or more designated recipient via one or more respective, specified delivery platform. For instance, the notification could be in the form of an e-mail message, a page, a facsimile, an SNMP alert an SMS message, a WAP alert, OPSEC warning a voice phone call or other suitable message. Alternatively, such a notification could be triggered by the outputted signal.

Instead of or in addition to a notification, one of more corrective measures could be triggered by the outputted signal. Such corrective measures could include refusing acceptance of further communications from the source of the received communication, quarantining the communication, stripping the communication so that it can be safely handled by the application server, and/or throttling excessive numbers of incoming connections per second to levels manageable by internal application servers.

In one preferred embodiment, an interface may be provided that allows an application administrator to selectively configure a desired response and associate this configured response with a particular anomaly type such that when an anomaly of that type is detected the configured response occurs.

Figure 4:
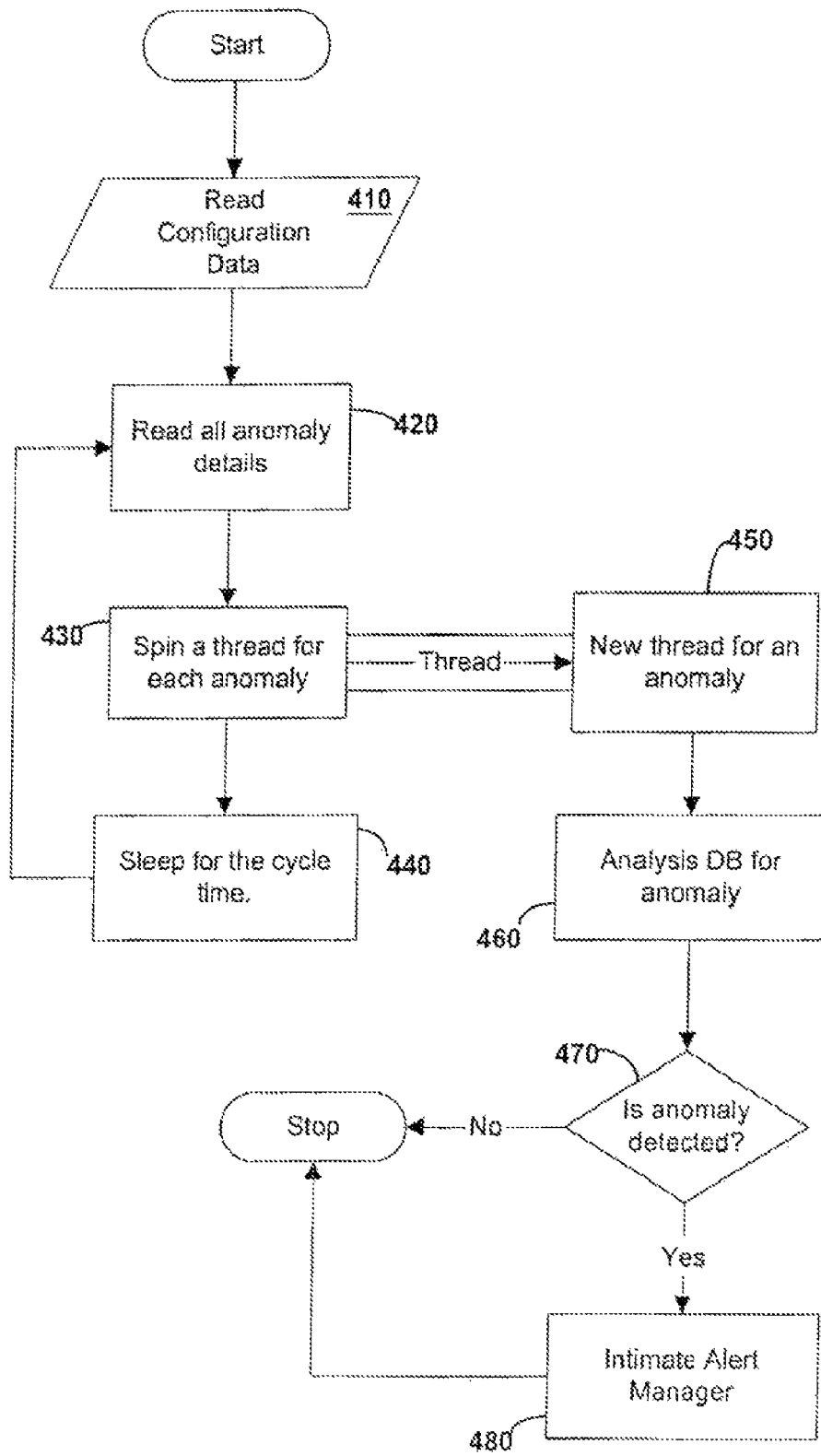
FIG. 4 is a flow chart of an exemplary anomaly detection process according to the present invention.

FIG. 4 depicts a flow chart in a typical anomaly detection process according to one preferred embodiment of the present invention. The process starts in step 410 by initializing various constraints of the process including the types of anomalies, thresholds for these types and time periods for which prior data is to be considered. This information may be configured interactively at initiation. In addition to, or instead of, the interactive configuration, previously stored configuration information may be loaded from the SDS.

The process continues at step 420 where anomaly definitional information is read (e.g. Incoming messages that have the same attachment within a 15 minute interval.) A determination is then made as to whether a new thread is needed; this determination is based upon the read the anomaly details (step not shown). In step 430, if a new thread is required, the thread is spun for processing in step 450. In step 440, the process sleeps for a specified period of time before returning to step 420 to read information regarding an anomaly.

Once processing of the new thread commences in step 450, information needed to evaluate the anomaly is retrieved from appropriate locations in the SDS, manipulated if needed, and analyzed in step 460. A determination in step 470 occurs to detect an anomaly. In one preferred embodiment, this step uses predetermined threshold values to make the determination, such predetermined threshold values could be provided interactively or via a configuration file. If an anomaly is not detected, the process stops.

If an anomaly is detected, an anomaly indicator signal is output at step 480 which may result in a notification. The possible results of anomaly detection are discussed in more detail above with respect to the Action Engine.

The types of anomalies may vary depending upon the type and nature of the particular application server. The following discussion provides exemplary definitions of anomalies where e-mail is the application context in question. Anomalies similar, or identical, to these can be defined with respect to other application server types.

Figure 5:
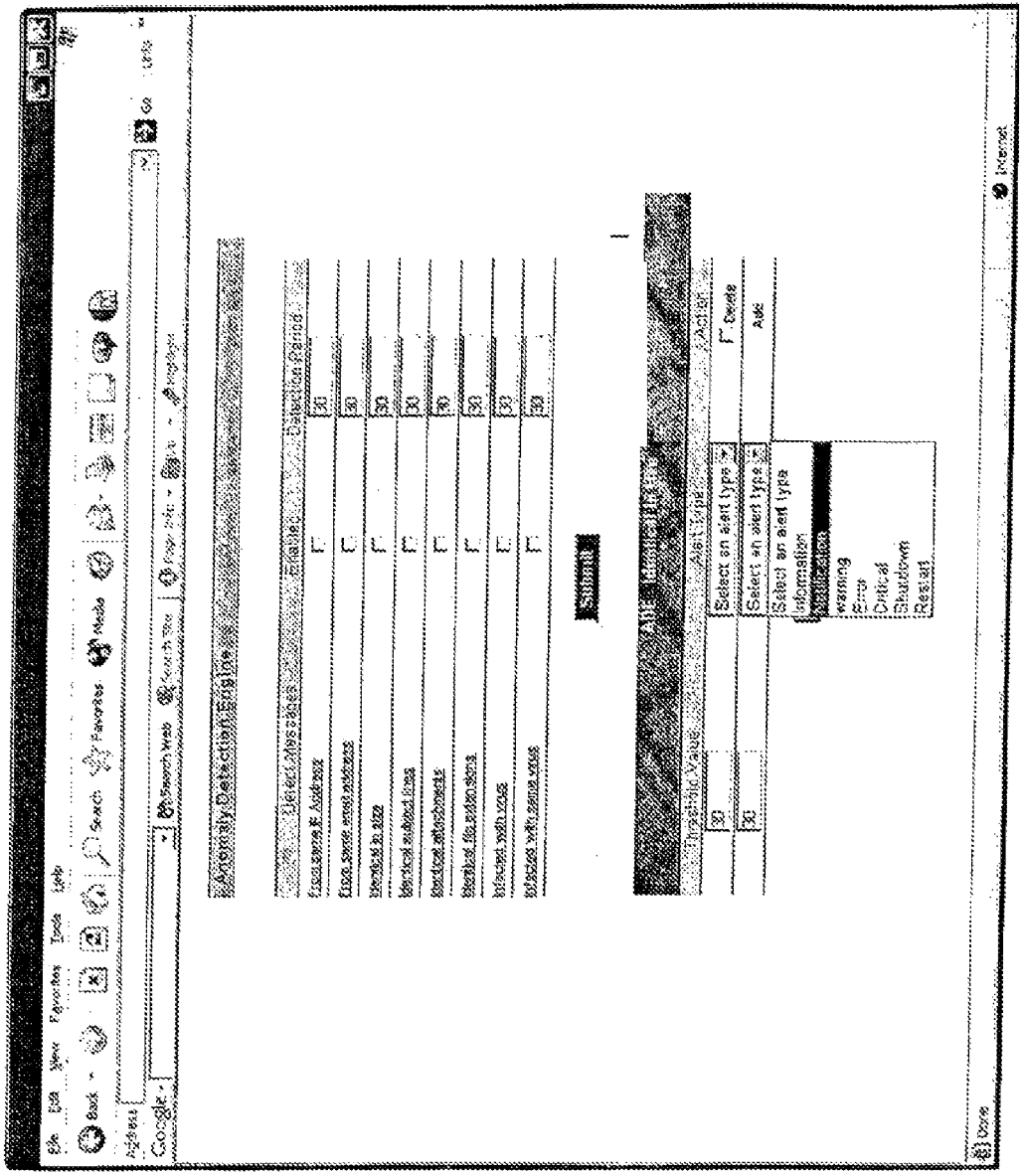
FIG. 5 is a sample anomaly detection configuration interface screen.

There are many potential anomaly types of interest in an e-mail system. The analysis is based on the collected data and dynamic rules for normality based on the historic audited data. In some embodiments, an application administrator can be provided with an interface for configuring predefined rules with respect to different anomaly types. FIG. 5 provides a sample screen for such an interface. The interface functionality may be provided via a Web server running on the security enhancement device or other suitable interface platform as discussed above.

In one preferred embodiment, the threshold value for the analysis for each anomaly is derived from an anomaly action table. The action for each anomaly is also taken from this table. The analysis identifies that some thing unusual has occurred and hand over to the action module. Enumerated below with respect to e-mail are anomalies of various types.

1. Messages from same IP Address—The point of collection of this anomaly is SMTPI/SMTPIS service. SMTPI/SMTPIS has information about the IP address from which the messages originate. The IP address is stored in the SDS. The criterion for this anomaly is that the number of message from the given period from the same IP address should be greater than the threshold. Based on the level of threshold, suitable alert is generated.
2. Messages from same Address (MAIL FROM)—The point of collection for this anomaly is SMTPI/SMTPIS service. SMTPI/SMTPIS has information about the address (MAIL FROM) from which the messages originate. The determined address is stored in the SDS. The criterion for this anomaly is that the number of message for the given period with the same MAIL FROM address should be greater than the threshold. Based on the level of threshold, suitable alert is generated.
3. Messages having same Size—The point of collection for this anomaly is SMTPI/SMTPIS service. SMTIP/SMTPIS has information about the size of the messages. The size of the message is stored in the SDS. This size denotes the size of the message body and does not include the size of the headers. The criterion for this anomaly is that the number of message for the given period with a same size should be greater than the threshold. Based on the level of threshold, suitable alert is generated.
4. Messages having same Subject—The point of collecting for this anomaly is SMTPI/SMTPIS service. SMTPI/SMTPIS has information about the subject line of the message. The subject line information for the message is stored in the SDS. The criterion for this anomaly is that the number of message for the given period with the same subject line should be greater than the threshold. Based on the level of threshold, suitable alert is generated.
5. Messages having same Attachment—The point of collection for this anomaly is the MIME Ripper Queue. The MIME Ripper Queue parses the actual message into the constituent MIME parts and stores the information in the SDS. A part of this information is the attachment file name. The criterion for this anomaly is that the number of message for the given period with same attachment name should be greater than the threshold. Based on the level of threshold, suitable alert is generated.
6. Messages having same Attachment Extension—The point of collection for this anomaly is the MIME Ripper Queue. The MIME Ripper Queue parses the actual message into the constituent MIME parts and stores the information in the SDS. A part of this information is the attachment file extension. The criterion for this anomaly is that the number of message for the given period with same extension should be greater than the threshold. Based on the level of threshold, suitable alert is generated.
7. Messages having Viruses—This anomaly will be detected only if any of the anti-virus queues are enabled. The point of collection for this anomaly is the anti-virus Queue. The anti-virus Queue scans for any viruses on each individual MIME parts of the message. The scan details are stored in the SDS. A part of this information is the virus name. The criterion for the anomaly is that the number of message for the given period detected with viruses should be greater than the threshold. Based on the level of threshold, suitable alert is generated.
8. Messages having same Viruses—This anomaly will be detected only if any of the anti-virus queues are enabled. The point of collection for this anomaly is the anti-virus Queue. The anti-virus Queue scans for any viruses on each individual MIME parts of the message. The scan details are entered into the SDS. A part of this information is the virus name. The criterion for this anomaly is that the number of message for the given period detected with same virus should be greater than the threshold. Based on the level of threshold, suitable alert is generated.

The table below depicts the fields in an anomaly table in one preferred embodiment using a relational database model for storing this information in the SDS.

| Sl No. | Field Name | Data Type | Remarks |
| --- | --- | --- | --- |
| 1. | anm_type | int | Primary key. Unique identifier for all anomalies. The list is given in the next section. |
| 2. | anm_name | varchar | Name of the Anomaly (Tag for the UI to display) |

-continued

| Sl No. | Field Name | Data Type | Remarks |
|---|---|---|---|
| 3. | can_display | tinyint | Anomaly is displayable or not in UI. 0 - Do not display 1 - Display |
| 4. | is_enabled | tinyint | Specifies if the anomaly is enabled or not 0 - Disabled 1 - Enabled |
| 5. | anm_period | int | Time in minutes. This time specifies the period for the anomaly check. |

The table below depicts the fields in an anomaly action table in one preferred embodiment using a relational database model for storing this information in the SDS.

| Sl No. | Field Name | Data Type | Remarks |
|---|---|---|---|
| 1. | anm_type | int | Foreign key from anomaly table. |
| 2. | anm_thresh | int | This value specifies the threshold for a particular action to be taken. |
| 3. | alert_type | int | This is a foreign key from alert_type table. This value specifies the type of alert to be sent to the alert manager when this anomaly is detected. |

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. A method for operation upon one or more data processors to assign a reputation to a messaging entity, the method comprising:
   receiving a communication from a messaging entity;
   deriving a risk profile for the communication comprising:
      queuing the communication for interrogation by a plurality of interrogation engines, each interrogation engine of a particular type designed to test the communication for a particular security risk;
      performing a load evaluation on an interrogation engine of one of the particular types based upon the plurality of interrogation engines queued to interrogate the communication;
      determining that the load evaluation exceeds a threshold, and in response adjusting the plurality of interrogation engines by generating a new instance of an interrogation engine of the one of the particular types based upon the plurality of interrogation engines queued to interrogate the communication;
      aggregating output of the plurality of interrogation engines with data associated with previously received communications to form the risk profile for the communication;
   determining, using one or more data processors, a reputation score associated with the communication based upon the risk profile;
   wherein the reputation score is indicative of reputation of the messaging entity;
   wherein the determined reputation score is used in deciding what action is to be taken with respect to communications associated with the messaging entity.

2. The method of claim 1, wherein the determined reputation score is distributed to one or more computer systems for use in filtering transmissions.

3. The method of claim 1, wherein the determined reputation score is locally distributed to a program for use in filtering transmissions.

4. The method of claim 1, further comprising:
   determining reputation indicative probabilities based upon the communication; wherein a reputation indicative probability indicates reputability of a messaging entity based upon an extent to which one or more characteristics of the communication exhibit or conform to one or more reputation-related criteria.

5. The method of claim 4, wherein a type of messaging entity to which reputations are assigned is a domain name, IP address, phone number, or individual electronic address or username representing an organization, computer, a message, or individual user that transmits electronic messages.

6. The method of claim 1 further comprising: determining reputation indicative probabilities based upon the communication; wherein a reputation indicative probability indicates reputability of a messaging entity based upon extent to which one or more characteristics of the communication exhibit or conform to one or more reputation-related criteria, wherein determining a reputation score includes determining the reputation score based upon aggregation of the reputation indicative probabilities.

7. The method of claim 1, wherein the communication comprises one of an electronic message communication, a VoIP communication, an HTTP communication, a FTP communication, an SMS communication, or an MMS communication.

8. The method of claim 1, further comprising adjusting a reputation of the messaging entity based upon the reputation score.

9. The method of claim 1, further comprising signing the communication and subparts of the communication; determining whether the message has been altered based upon signatures produced by the signing operation.

10. The method of claim 1, further comprising: comparing a reputation associated with a first messaging entity to a reputation of a second messaging entity, wherein the first and second messaging entities are associated with each other; and, reconciling any differences between the first and second messaging entity.

11. The method of claim 10, wherein the first messaging entity is a phone number, and the second messaging entity is an internet protocol address associated with the phone number.

12. The method of claim 2, wherein distributing the reputation score comprises distributing the reputation score to one or more computers that are remote from the one or more data processors.

13. The method of claim 1, wherein adjusting the plurality of the interrogation engines comprises:
   generating a new index queue;
   associating the new index queue with the new instance of the interrogation engine; and assigning an index associated with the communication to the new index queue so that the new instance of the interrogation engine tests the communication for a particular security risk.

14. A computer-implemented method of performing transmission filtering utilizing reputation scores of transmission sender, the method comprising:

storing a transmission from a sender in computer memory;
deriving a risk profile for the transmission comprising:
queuing the transmission for interrogation by a plurality of interrogation engines, each interrogation engine of a particular type designed to test the transmission for a particular security risk;
performing a load evaluation on an interrogation engine of one of the particular types based upon the plurality of interrogation engines queued to interrogate the transmission;
determining that the load evaluation exceeds a threshold, and in response adjusting the plurality of the interrogation engines by generating a new instance of an interrogation engine of the one of the particular types based upon the plurality of interrogation engines queued to interrogate the communication;
aggregating output of the plurality of interrogation engines with data associated with previously received transmission to form the risk profile for the transmission;
determining a reputation score associated for the sender based upon the risk profile;
performing, using one or more data processors, an action on the transmission from the sender corresponding to the score range of the reputation score associated with the sender.

15. The method of claim 14, wherein the action includes at least one of the following actions:
rejecting all further transmissions from that sender for a period of time or number of transmissions;
silently dropping all further transmissions from that sender for a period of time or number of transmissions;
quarantining all further transmissions from that sender for a period of time or number of transmissions; or
bypassing certain filtering tests for all further transmissions from that sender for a period of time or number of transmissions.

16. The method of claim 14, wherein adjusting the plurality of the interrogation engines comprises:
generating a new index queue;
associating the new index queue with the new instance of the interrogation engine; and
assigning an index associated with the communication to the new index queue so that the new instance of the interrogation engine tests the transmission for a particular security risk.

17. A system, comprising:
a computer processing device; and
a memory device storing instructions executable by the computer processing device that upon such execution cause the computer processing device to perform operations comprising:
receiving a communication from a messaging entity;
deriving a risk profile for the communication comprising:
queuing the communication for interrogation by a plurality of interrogation engines, each interrogation engine of a particular type designed to test the communication for a particular security risk;
performing a load evaluation on a interrogation engine of one of the particular types based upon the plurality of interrogation engines queued to interrogate the communication;
determining that the load evaluation exceeds a threshold, and in response adjusting the plurality of the interrogation engines by generating a new instance of an interrogation engine of the one of the particular types based upon the plurality of interrogation engines queued to interrogate the communication;
aggregating output of the plurality of interrogation engines with data associated with previously received communications to form the risk profile for the communication;
determining, using one or more data processors, a reputation score associated with the communication based upon the risk profile;
wherein the reputation score is indicative of reputation of the messaging entity;
wherein the determined reputation score is used in deciding what action is to be taken with respect to communications associated with the messaging entity.

* * * * *

UNITED STATES PATENT AND TRADEMARK OFFICE
CERTIFICATE OF CORRECTION

PATENT NO. : 8,069,481 B2  Page 1 of 1
APPLICATION NO. : 11/456960
DATED : November 29, 2011
INVENTOR(S) : Paul Judge It is certified that error appears in the above-identified patent and that said Letters Patent is hereby corrected as shown below:

In column 36, Line 22, in Claim 17, delete "on a" and insert --on an--, therefor.

Signed and Sealed this
Thirty-first Day of January, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,069,481 B2 | Page 1 of 1 |
| APPLICATION NO. | : 11/456960 | |
| DATED | : November 29, 2011 | |
| INVENTOR(S) | : Paul Judge | |

It is certified that error appears in the above-identified patent and that said Letters Patent is hereby corrected as shown below:

Cover page item (57), Line 9 of Abstract, please delete "conjuntion" and insert -- conjunction --, therefor.

Signed and Sealed this
Third Day of April, 2012

David J. Kappos
*Director of the United States Patent and Trademark Office*